United States Patent

Goda et al.

[11] Patent Number: 6,004,695
[45] Date of Patent: Dec. 21, 1999

[54] NONAQUEOUS SECONDARY BATTERY

[75] Inventors: Kensuke Goda; Yukio Miyaki; Yukio Maekawa; Masayuki Mishima, all of Kanagawa, Japan

[73] Assignee: Fuji Photo Film Co., Ltd., Kanagawa, Japan

[21] Appl. No.: 08/930,336

[22] PCT Filed: Apr. 18, 1996

[86] PCT No.: PCT/JP96/01059

§ 371 Date: Sep. 29, 1997

§ 102(e) Date: Sep. 29, 1997

[87] PCT Pub. No.: WO96/33519

PCT Pub. Date: Oct. 24, 1996

[30] Foreign Application Priority Data

| Apr. 19, 1995 | [JP] | Japan | ................................... | 7-116594 |
| Apr. 20, 1995 | [JP] | Japan | ................................... | 7-095376 |
| Apr. 28, 1995 | [JP] | Japan | ................................... | 7-106265 |
| Apr. 28, 1995 | [JP] | Japan | ................................... | 7-106267 |
| Oct. 25, 1995 | [JP] | Japan | ................................... | 7-277317 |

[51] Int. Cl.$^6$ .................................................... H01M 4/48
[52] U.S. Cl. ...................... 429/218.1; 429/221; 429/224; 429/225
[58] Field of Search .................................. 429/218.1, 221, 429/224, 225

[56] References Cited

U.S. PATENT DOCUMENTS

| 5,618,640 | 4/1997 | Idota et al. ............................... 429/194 |
| 5,766,791 | 6/1998 | Takahashi et al. ......................... 429/57 |

FOREIGN PATENT DOCUMENTS

| 0785 586 A1 | 7/1997 | European Pat. Off. ......... H01M 4/48 |
| WO97/01870 | 1/1997 | WIPO ............................. H01M 4/02 |

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57] ABSTRACT

A nonaqueous secondary battery having a high discharge voltage, a high discharge capacity, satisfactory charge and discharge cycle characteristics, and assured safety is disclosed, comprising a positive electrode material, a negative electrode material, a nonaqueous electrolyte containing a lithium salt, and a separator, wherein the negative electrode material mainly comprises an amorphous oxide containing at least one functional element selected from the group consisting of Sn, Mn, Fe, Pb, and Ge.

23 Claims, 2 Drawing Sheets

NONAQUEOUS SECONDARY BATTERY

FIELD OF THE INVENTION

This invention relates to a novel nonaqueous secondary battery having a high discharge potential, a high capacity, satisfactory cycle characteristics, satisfactory storage stability, and excellent safety.

BACKGROUND OF THE INVENTION

With the recent spread of portable personal computers and mobile phones, the demand for secondary batteries having a higher capacity has been increasing. To meet the demand, extensive development of lithium secondary batteries having a high capacity is proceeding.

Metallic lithium and lithium alloys capable of realizing a high capacity have been used typically as a negative electrode material from the start of the development of lithium secondary batteries. Because these lithium materials form a dendrite that causes a danger of ignition or a burst, calcined carbonaceous materials capable of intercalating and desintercalating lithium have been put to practical use. However, carbonaceous materials have a disadvantage of a small discharge capacity.

JP-A-6-275268 (the term "JP-A" as used herein means an "unexamined published Japanese patent application") and JP-A-6-338325 describe the use of SnO and the use of a composite oxide comprising tin and other elements, respectively as a negative electrode material. Some of the negative electrode materials disclosed in these publications have a high capacity but insufficient cycle characteristics. In addition, the high capacity tends to give rise to such accidents as a sudden increase in battery temperature or a spout of the contents due to abnormalities such as a short circuit. That is, safety is not ensured sufficiently.

Accordingly, an object of the present invention is to provide a nonaqueous secondary battery having a high discharge potential, a high capacity, satisfactory cycle characteristics, and excellent safety.

DISCLOSURE OF THE INVENTION

The object of the invention is accomplished by a nonaqueous secondary battery comprising a positive electrode material, a negative electrode material, a nonaqueous electrolyte containing a lithium salt, and a separator, which is characterized in that the negative electrode material consists mainly of an amorphous oxide containing at least one functional element selected from Sn, Mn, Fe, Pb, and Ge, which embraces the following embodiments:

(1) A nonaqueous secondary battery comprising a positive electrode material, a negative electrode material, a nonaqueous electrolyte containing a lithium salt, and a separator, which is characterized in that the negative electrode material consists mainly of an amorphous oxide containing at least one functional element selected from Sn, Mn, Fe, Pb, and Ge.

(2) The nonaqueous secondary battery described in (1) above, wherein the negative electrode material consists mainly of an amorphous oxide containing Sn and Ge.

(3) The nonaqueous secondary battery described in (1) above, which is characterized in that the negative electrode material consists mainly of an amorphous oxide containing at least one functional element selected from Sn, Mn, Fe, Pb, and Ge and at least one amorphous body-forming element (i.e., glass-forming element) selected from Al, B, P, elements of the groups 1, 2 and 3 of the Periodic Table, and halogen elements.

(4) The nonaqueous secondary battery described in (3) above, which is characterized in that the negative electrode material consists mainly of an amorphous oxide containing at least one functional element selected from Sn, Mn, Fe, Pb, and Ge and at least one amorphous body-forming element having a standard electrode potential (25° C.) of −3.05 to −2.30 $E^0/V$ in an aqueous solution which is selected from the elements of groups 1, 2 and 3 of the Periodic Table and halogen elements.

(5) The nonaqueous secondary battery described in (3) or (4) above, which is characterized in that the negative electrode material consists mainly of an amorphous oxide containing at least one functional element selected from Sn, Mn, Fe, Pb, and Ge and at least one amorphous body-forming element selected from Mg, Al, B, P, and F.

(6) The nonaqueous secondary battery described in (5) above, which is characterized in that the negative electrode material consists mainly of an amorphous oxide containing at least one functional element selected from divalent Sn, divalent Mn, trivalent Mn, divalent Fe, divalent Pb, and divalent Ge and at least one amorphous solid-forming element selected from Mg, Al, B, P, and F.

(7) The nonaqueous secondary battery described in (6) above, which is characterized in that the negative electrode material consists mainly of an amorphous oxide containing Sn as a functional element and at least one amorphous solid-forming element selected from Mg, Al, B, P, and F.

(8) The nonaqueous secondary battery described in (3) above, which is characterized in that the negative electrode material consists mainly of an amorphous oxide containing at least one functional element selected from Sn, Mn, Fe, Pb, and Ge and at least two amorphous body-forming elements selected from Al, B, P, elements of the groups 1, 2 and 3 of the Periodic Table, and halogen elements.

(9) The nonaqueous secondary battery described in (8) above, which is characterized in that the negative electrode material consists mainly of an amorphous oxide containing at least one functional element selected from divalent Sn, divalent Mn, trivalent Mn, divalent Fe, divalent Pb, and divalent Ge and at least two amorphous body-forming elements selected from Al, B, P, elements of the groups 1, 2 and 3 of the Periodic Table, and halogen elements.

(10) The nonaqueous secondary battery described in (9) above, which is characterized in that the negative electrode material is an amorphous composite oxide represented by formula (1):

$$Sn_a M^1_{1-a} M^2_b O_z \qquad (1)$$

wherein $M^1$ represents at least one of Mn, Fe, Pb, and Ge; $M^2$ represents at least two of Al, B, P, the elements of groups 1, 2 and 3 of the Periodic Table, and halogen elements; a represents a number of greater than 0 to not greater than 1; b represents a number of 0.1 to 3; and z represents a number of 1 to 8.

(11) The nonaqueous secondary battery described in (10) above, which is characterized in that the negative electrode material is an amorphous composite oxide represented by formula (2):

$$SnM^3_c M^4_d O_y \qquad (2)$$

wherein $M^3$ represents at least two of Al, B, and P; $M^4$ represents at least one of the elements of groups 1, 2 and 3 of the Periodic Table, and halogen elements; c represents a number of 0.2 to 2; d represents a number of 0.01 to 1, provided that $0.21 < c+d < 2$; and y represents a number of 1 to 6.

(12) The nonaqueous secondary battery described in (11) above, which is characterized in that the negative electrode material is an amorphous composite oxide represented by formula (3):

$$SnM^3_cM^5_dO_y \qquad (3)$$

wherein $M^3$ represents at least two of Al, B, and P; $M^5$ represents at least on of K, Na, Rb, Cs, Ca, Mg, Ba, and Y; c represents a number of 0.2 to 2; d represents a number of 0.01 to 1, provided that 0.21<c+d<2; and y represents a number of 1 to 6.

(13) The nonaqueous secondary battery described in (12) above, which is characterized in that the negative electrode material is an amorphous composite oxide represented by formula (4):

$$SnM^3_cM^6_dO_y \qquad (4)$$

wherein $M^3$ represents at least two of Al, B, and P; $M^6$ represents at least one of K, Na, Rb, and Cs; c represents a number of 0.2 to 2; d represents a number of 0.01 to 1, provided that 0.21<c+d<2; and y represents a number of 1 to 6.

(14) The nonaqueous secondary battery described in (11) above, which is characterized in that the negative electrode material is an amorphous composite oxide represented by formula (5):

$$SnM^3_cM^5_dM^7_eO_y \qquad (5)$$

wherein $M^3$ represents at least two of Al, B, and P; $M^5$ represents at least one of K, Na, Rb, Cs, Ca, Mg, Ba, and Y; $M^7$ represents F; c represents a number of 0.2 to 2; d and e each represent a number of 0.01 to 1, provided that 0.22<c+d<2; and y represents a number of 1 to 6.

(15) The nonaqueous secondary battery described in (2) or (3) above, which is characterized in that the negative electrode material is an amorphous composite oxide represented by formula (6):

$$SnGe_fM^8_gM^4_hO_x \qquad (6)$$

wherein $M^8$ represents at least one of Al, B, and P; $M^4$ represents at least one of the elements of the groups 1, 2 and 3 of the Periodic Table, and halogen elements; f represents a number of 0.001 to 1; g represents a number of 0.2 to 2; h represents a number of 0.01 to 1; and x represents a number of 1.3 to 7.

(16) The nonaqueous secondary battery described in (15) above, which is characterized in that the negative electrode material is an amorphous composite oxide represented by formula (7):

$$SnGe_fM^8_gM^9_hO_x \qquad (7)$$

wherein $M^8$ represents at least one of Al, B, and P; $M^9$ represents at least one of K, Na, Rb, Cs, Ca, Mg, and Ba; f represents a number of 0.001 to 1; g represents a number of 0.2 to 2; h represents a number of 0.01 to 1; and x represents a number of 1.3 to 7.

(17) The nonaqueous secondary battery described in (16) above, which is characterized in that the negative electrode material is an amorphous composite oxide represented by formula (8):

$$SnGe_fM^8_gM^{10}_hO_x \qquad (8)$$

wherein $M^8$ represents at least one of Al, B, and P; $M^{10}$ represents at least one of K, Rb, Cs, and Mg; f represents a number of 0.001 to 1; g represents a number of 0.2 to 2; h represents a number of 0.01 to 1; and x represents a number of 1.3 to 7.

(18) The nonaqueous secondary battery described in (17) above, which is characterized in that the negative electrode material, is an amorphous composite oxide represented by formula (9):

$$SnGe_iM^8_jM^{10}_kO_w \qquad (9)$$

wherein $M^8$ represents at least one of Al, B, and P; $M^{10}$ represents at least one of K, Rb, Cs, and Mg; i represents a number of 0.01 to 0.5; j represents a number of 0.4 to 1.3; k represents a number of 0.05 to 0.5; and w represents a number of 1.3 to 6.

(19) The nonaqueous secondary battery described in (1) to (18) above, which is characterized in that the negative electrode material is obtained by calcination comprising heating at a rate of 5 to 200° C./min, maintaining at 500 to 1500° C. for 0.1 to 100 hours, and cooling at a rate of 2 to $10^{7}$° C./min.

(20) The nonaqueous secondary battery described in (1) to (19) above, which is characterized in that the negative electrode material contains 0 to 10 wt % of particles having a particle size of 25 to 100 $\mu$m.

(21) The nonaqueous secondary battery described in (1) to (20) above, which is characterized in that the negative electrode material contains 0.01 to 5 wt % of particles having a particle size of 0.01 to 1 $\mu$m.

(22) The nonaqueous secondary battery described in (1) to (21) above, which is characterized in that at least part of the positive electrode material is $Li_lQO_v$, wherein at least part of Q is a transition metal(s) at least one of which is selected from Co, Mn, Ni, V, and Fe; l=0.2 to 1.2; v=1.4 to 3.

(23) The nonaqueous secondary battery described in (1) to (22) above, which is characterized in that the solvent of the nonaqueous electrolyte contains ethylene carbonate.

(24) The nonaqueous secondary battery described in (1) to (23) above, which is characterized in that the negative electrode and/or positive electrode has at least one protective layer.

(25) The nonaqueous secondary battery described in (1) to (24) above, which is characterized in that the separator is a porous film or fabric each containing at least 20% by weight of an ethylene component.

The present invention is described below in detail.

The term "functional element" as used herein means an element that exists in an amorphous solid and changes its valence on intercalation and deintercalation of lithium ions to thereby contribute to a charge and discharge capacity. Transition metal elements, e.g., iron and manganese, are generally accepted as typical functional elements. In the present invention, tin, lead, germanium, etc. can be mentioned as functional elements exhibiting excellent performance.

It is preferable that a functional element capable of existing stably in an amorphous solid has a relatively small valence among the valences in which the element can have. For example, it is desirable for manganese, which can exhibit a divalent state, a trivalent state, and a tetravalent state, to exit in a solid in its divalent or trivalent state, particularly a divalent state.

The term "functional element" as used herein denotes Sn, Mn, Fe, Pb or Ge or a combination of two or more thereof.

Preferred elements and the valent state thereof are $Sn^{2+}$, $Mn^{2+}$, $Mn^{3+}$, $Fe^{2+}$, $Ge^{2+}$, and combinations thereof. Particularly preferred functional elements and the valent state thereof are $Sn^{2+}$, a combination of $Sn^{2+}$ and $Mn^{2+}$, and a combination of $Sn^{2+}$ and $Fe^{2+}$. A combination of Sn and Ge is also preferred. In this case, either of a combination of $Sn^{2+}$ and $Ge^{4+}$ and a combination of $Sn^{2+}$ and $Ge^{2+}$ is preferred.

The term "amorphous body-forming element" as used herein means an element capable of forming an amorphous body with the functional element, and is sometimes called "glass-forming element". At least one element selected from Al, B, P, elements of the groups 1, 2 and 3 of the Periodic Table, and halogen elements is used as an amorphous body-forming element. In one preferred embodiment of the invention, the negative electrode material consists mainly of an amorphous oxide containing at least one functional element selected from Sn, Mn, Fe, Pb, and Ge and at least one amorphous solid-forming element having a standard electrode potential (25° C.) of −3.05 to −2.30 $E°/V$ in an aqueous solution which is selected from elements of groups 1, 2 and 3 of the Periodic Table and halogen elements.

The language "standard electrode potential (25° C.) in an aqueous solution" as used herein means the electromotive force of a battery comprising a standard hydrogen electrode and an electrode containing an element to be evaluated combined in an aqueous solution at 25° C. with reference to the standard hydrogen electrode. The standard electrode potentials (25° C.) of the electrode reaction of the group 1 elements, the group 2 elements and the group 3 elements of the Periodic Table in an aqueous solution are given in Denki Kagaku Kyokai (ed.), *Denki Kagaku Binran* (4th Ed.), (1985) and/or MARCEL DEKKER, Inc., *Standard Potentials in Aqueous Solution,* IUPAC, (1985).

The elements whose standard electrode potential (25° C.) in an aqueous solution is from −3.05 to −2.30 $E°/V$ are shown below together with their standard electrode potential (25° C.; $E°/V$).

Group 1 Elements: Li (−3.040); Na (−2.714); K (−2.936); Rb (−2.943); Cs (−3.207)
Group 2 Elements: Mg (−2.37); Ca (−2.87); Sr (−2.90); Ba (−2.91)
Group 3 Elements: Y (−2.40); La (−2.37)

A still preferred standard electrode potential (25° C.) is from −3.03 to −2.70 $E°/V$, and the elements having the still preferred standard electrode potential (25° C.) include Na, K, Rb, Ca, Cs, Sr, and Ba. A particularly preferred standard electrode potential (25° C.) is from −3.03 to −2.90 $E°/V$, and the elements having the particularly preferred standard electrode potential (25° C.) include K, Rb, Cs, Sr, and Ba. One or more kinds of these elements are incorporated in the form of an oxide into the amorphous composite oxide.

In another preferred embodiment of the invention, the negative electrode material consists mainly of an amorphous oxide containing at least one functional element selected from Sn, Mn, Fe, Pb, and Ge and at least one amorphous solid-forming element selected from Mg, Al, B, P, and F.

The negative electrode material of this embodiment preferably consists mainly of an amorphous oxide containing at least one functional element selected from divalent Sn, divalent Mn, trivalent Mn, divalent Fe, divalent Pb, and divalent Ge and at least one amorphous solid-forming element selected from Mg, Al, B, P, and F. It is still preferred that the functional element is Sn, and the amorphous solid-forming element is selected from Mg, Al, B, P, and F.

Specific examples of the above-described compounds are shown below, but the invention is not limited thereto.

$SnO.BO_{1.5}$, $SnO.PO_{2.5}$, $SnO.B_{0.5}P_{0.5}O_2$, $SnO.Mg_{0.1}B_{0.9}O_{1.45}$, $SnO.Mg_{0.1}P_{0.9}O_{2.35}$, $SnO.Mg_{0.2}B_{0.4}P_{0.4}O_{1.8}$, $SnO.Al_{0.1}B_{0.9}O_{1.5}$, $SnO.Al_{0.1}P_{0.9}O_{2.4}$, $SnO.Al_{0.2}B_{0.4}P_{0.4}O_{1.9}$, $SnO.B_{0.4}P_{0.4}F_{0.2}O_{1.5}$;

$GeO.BO_{1.5}$, $GeO.PO_{2.5}$, $GeO.B_{0.5}P_{0.5}O_2$, $GeO.Mg_{0.1}B_{0.9}O_{1.45}$, $GeO.Mg_{0.1}P_{0.9}O_{2.35}$, $GeO.Mg_{0.2}B_{0.4}P_{0.4}O_{1.8}$, $GeO.Al_{0.1}B_{0.9}O_{1.5}$, $GeO.Al_{0.1}P_{0.9}O_{2.4}$, $GeO.Al_{0.2}B_{0.4}P_{0.4}O_{1.9}$, $GeO.B_{0.4}P_{0.4}F_{0.2}O_{1.5}$;

$MnO.BO_{1.5}$, $MnO.PO_{2.5}$, $MnO.B_{0.5}P_{0.5}O_2$, $MnO.Mg_{0.1}B_{0.9}O_{1.45}$, $MnO.Mg_{0.1}P_{0.9}O_{2.35}$, $MnO.Mg_{0.2}B_{0.4}P_{0.4}O_{1.8}$, $MnO.Al_{0.1}B_{0.9}O_{1.5}$, $MnO.Al_{0.1}P_{0.9}O_{2.4}$, $MnO.Al_{0.2}B_{0.4}P_{0.4}P_{1.9}$, $MnO.B_{0.4}P_{0.4}F_{0.2}O_{1.5}$;

$FeO.BO_{1.5}$, $FeO.PO_{2.5}$, $FeO.B_{0.5}P_{0.5}O_2$, $FeO.Mg_{0.1}B_{0.9}O_{1.45}$, $FeO.Mg_{0.1}P_{0.9}O_{2.35}$, $FeO.Mg_{0.2}B_{0.4}P_{0.4}O_{1.8}$, $FeO.Al_{0.1}B_{0.9}O_{1.5}$, $FeO.Al_{0.1}P_{0.9}O_{2.4}$, $FeO.Al_{0.2}B_{0.4}P_{0.4}P_{1.9}$, $FeO.B_{0.4}P_{0.4}F_{0.2}O_{1.5}$;

$PbO.BO_{1.5}$, $PbO.PO_{2.5}$, $PbO.B_{0.5}P_{0.5}O_2$, $PbO.Mg_{0.1}B_{0.9}O_{1.45}$, $PbO.Mg_{0.1}P_{0.9}O_{2.35}$, $PbO.Mg_{0.2}B_{0.4}P_{0.4}O_{1.8}$, $PbO.Al_{0.1}B_{0.9}O_{1.5}$, $PbO.Al_{0.1}P_{0.9}O_{2.4}$, $PbO.Al_{0.2}B_{0.4}P_{0.4}P_{1.9}$, $PbO.B_{0.4}P_{0.4}F_{0.2}O_{1.5}$;

$Sn_{0.5}Mn_{0.5}O.BO_{1.5}$, $Sn_{0.5}Mn_{0.5}O.PO_{2.5}$, $Sn_{0.5}Mn_{0.5}O.B_{0.5}P_{0.5}O_2$, $Sn_{0.5}Mn_{0.5}O.Mg_{0.1}B_{0.9}O_{1.45}$, $Sn_{0.5}Mn_{0.5}O.Mg_{0.1}P_{0.9}O_{2.35}$, $Sn_{0.5}Mn_{0.5}O.Mg_{0.2}B_{0.4}P_{0.4}O_{1.8}$, $Sn_{0.5}Mn_{0.5}O.Al_{0.1}B_{0.9}O_{1.5}$, $Sn_{0.5}Mn_{0.5}O.Al_{0.1}P_{0.9}O_{2.4}$, $Sn_{0.5}Mn_{0.5}O.Al_{0.2}B_{0.4}P_{0.4}P_{1.9}$, $Sn_{0.5}Mn_{0.5}O.B_{0.4}P_{0.4}F_{0.2}O_{1.5}$;

$Sn_{0.5}Fe_{0.5}O.BO_{1.5}$, $Sn_{0.5}Fe_{0.5}O.PO_{2.5}$, $Sn_{0.5}Fe_{0.5}O.B_{0.5}P_{0.5}O_2$, $Sn_{0.5}Fe_{0.5}O.Mg_{0.1}B_{0.9}O_{1.45}$, $Sn_{0.5}Fe_{0.5}O.Mg_{0.1}P_{0.9}O_{2.35}$, $Sn_{0.5}Fe_{0.5}O.Mg_{0.2}B_{0.4}P_{0.4}O_{1.8}$, $Sn_{0.5}Fe_{0.5}O.Al_{0.1}B_{0.9}O_{1.5}$, $Sn_{0.5}Fe_{0.5}O.Al_{0.1}P_{0.9}O_{2.4}$, $Sn_{0.5}Fe_{0.5}O.Al_{0.2}B_{0.4}P_{0.4}P_{1.9}$, $Sn_{0.5}Fe_{0.5}O.B_{0.4}P_{0.4}F_{0.2}O_{1.5}$;

$SnO.0.5(BO_{1.5})$, $SnO.0.5(PO_{2.5})$, $SnO.0.5(B_{0.5}P_{0.5}O_2)$, $SnO.0.5(Mg_{0.1}B_{0.9}O_{1.45})$, $SnO.0.5(Mg_{0.1}P_{0.9}O_{2.35})$, $SnO.0.5(Mg_{0.2}B_{0.4}P_{0.4}O_{1.8})$, $SnO.0.5(Al_{0.1}B_{0.9}O_{1.5})$, $SnO.0.5(Al_{0.1}P_{0.9}O_{2.4})$, $SnO.0.5(Al_{0.2}B_{0.4}P_{0.4}P_{1.9})$, $SnO.0.5(B_{0.4}P_{0.4}F_{0.2}O_{1.5})$;

$SnO.1.5(BO_{1.5})$, $SnO.1.5(PO_{2.5})$, $SnO.1.5(B_{0.5}P_{0.5}O_2)$, $SnO.1.5(Mg_{0.1}B_{0.9}O_{1.45})$, $SnO.1.5(Mg_{0.1}P_{0.9}O_{2.35})$, $SnO.1.5(Mg_{0.2}B_{0.4}P_{0.4}O_{1.8})$, $SnO.1.5(Al_{0.1}B_{0.9}O_{1.5})$, $SnO.1.5(Al_{0.1}P_{0.9}O_{2.4})$, $SnO.1.5(Al_{0.2}B_{0.4}P_{0.4}P_{1.9})$, $SnO.1.5(B_{0.4}P_{0.4}F_{0.2}O_{1.5})$.

In still another preferred embodiment of the invention, the negative electrode material consists mainly of an amorphous oxide containing at least one functional element selected from Sn, Mn, Fe, Pb, and Ge and at least two amorphous solid-forming elements selected from Al, B, P, elements of groups 1, 2 and 3 of the Periodic Table, and halogen elements.

Preferably, the negative electrode material consists mainly of an amorphous oxide containing at least one functional element selected from divalent Sn, divalent Mn, trivalent Mn, divalent Fe, divalent Pb, and divalent Ge and at least two amorphous solid-forming elements selected from Al, B, P, elements of the group 1, 2 and 3 of the Periodic Table, and halogen elements.

Still preferably, the negative electrode material is an amorphous composite oxide represented by formula (1):

$$Sn_aM^1_{1-a}M^2_bO_z \qquad (1)$$

wherein $M^1$ represents at least one of Mn, Fe, Pb, and Ge; $M^2$ represents at least two of Al, B, P, the group 1 elements, the group 2 elements and the group 3 elements of the Periodic Table, and halogen elements; a represents a number of greater than 0 and not greater than 1; b represents a number of 0.1 to 3; and z represents a number of 1 to 8.

Still preferably, the negative electrode material is an amorphous composite oxide represented by formula (2):

$$SnM^3_c M^4_d O_y \quad (2)$$

wherein $M^3$ represents at least two of Al, B, and P; $M^4$ represents at least one of the group 1 elements, the group 2 elements and the group 3 elements of the Periodic Table, and halogen elements; c represents a number of 0.2 to 2; d represents a number of 0.01 to 1 provided that $0.21<c+d<2$; and y represents a number of 1 to 6.

Still more preferably, the negative electrode material is an amorphous compound oxide represented by formula (3):

$$SnM^3_c M^5_d O_y \quad (3)$$

wherein $M^3$ represents at least two of Al, B, and P; $M^5$ represents at least one of K, Na, Rb, Cs, Ca, Mg, Ba, and Y; c represents a number of 0.2 to 2; d represents a number of 0.01 to 1 provided that $0.21<c+d<2$; and y represents a number of 1 to 6.

Particularly preferably, the negative electrode material is an amorphous composite oxide represented by formula (4):

$$SnM^3_c M^6_d O_y \quad (4)$$

wherein $M^3$ represents at least two of Al, B, and P; $M^6$ represents at least one of K, Na, Rb, and Cs; c represents a number of 0.2 to 2; d represents a number of 0.01 to 1 provided that $0.21<c+d<2$; and y represents a number of 1 to 6.

It is also preferred that the negative electrode material is an amorphous composite oxide represented by formula (5):

$$SnM^3_c M^5_d M^7_e O_y \quad (5)$$

wherein $M^3$ represents at least two of Al, B, and P; $M^5$ represents at least one of K, Na, Rb, Cs, Ca, Mg, Ba, and Y; $M^7$ represents F; c represents a number of 0.2 to 2; d and e each represent a number of 0.01 to 1 provided that $0.22<c+d<2$; and y represents a number of 1 to 6.

Specific examples of these compounds are shown below, but the invention is not limited thereto.

$SnB_{0.5}P_{0.5}O_3$, $SnB_{0.25}P_{0.25}O_2$, $SnAl_{0.05}B_{0.45}O_{1.75}$,
$SnAl_{0.05}P_{0.45}O_{2.2}$, $SnAl_{0.1}B_{0.9}O_{2.5}$,
$SnAl_{0.1}B_{0.2}P_{0.2}O_{1.95}$, $SnB_{0.75}P_{0.75}O_4$,
$SnAl_{0.15}B_{1.45}O_{3.25}$, $SnAl_{0.15}P_{1.45}O_{4.6}$,
$SnAl_{0.3}B_{0.6}P_{0.6}O_{3.85}$, $SnAl_{0.1}P_{0.9}O_{3.4}$,
$SnAl_{0.2}B_{0.4}P_{0.4}O_{2.9}$,
$MnAl_{0.1}P_{0.9}O_{3.4}$, $GeAl_{0.1}P_{0.9}O_{3.4}$,
$PbAl_{0.1}P_{0.9}O_{3.4}$, $FeAl_{0.2}B_{0.4}P_{0.4}O_{2.9}$,
$Sn_{0.5}Mn_{0.5}BO_{2.5}$, $Sn_{0.5}Ge_{0.5}BO_{2.5}$,
$Sn_{0.5}Fe_{0.5}PO_{3.5}$, $Sn_{0.5}Mn_{0.5}B_{0.5}P_{0.5}O_3$,
$Sn_{0.5}Pb_{0.5}B_{0.5}P_{0.5}O_3$,
$Sn_{0.5}Mn_{0.5}Mg_{0.1}B_{0.9}O_{2.45}$,
$Sn_{0.5}Mn_{0.5}Ca_{0.1}P_{0.9}O_{3.35}$,
$Sn_{0.5}Ge_{0.5}Mg_{0.1}P_{0.9}O_{3.35}$,
$Sn_{0.5}Fe_{0.5}Mg_{0.1}P_{0.9}O_{3.35}$,
$Sn_{0.5}Mn_{0.5}Ba_{0.2}B_{0.4}P_{0.4}O_{2.8}$,
$Sn_{0.5}Fe_{0.5}Al_{0.1}B_{0.9}O_{2.5}$,
$Sn_{0.5}Mn_{0.5}Al_{0.1}P_{0.9}O_{3.4}$,
$Sn_{0.5}Fe_{0.5}Al_{0.2}B_{0.4}P_{0.4}O_{2.9}$,
$Sn_{0.5}Mn_{0.5}B_{0.4}P_{0.4}F_{0.2}O_{2.5}$,
$Sn_{0.5}Fe_{0.5}B_{0.4}P_{0.4}F_{0.2}O_{2.5}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}Ca_{0.1}Rb_{0.1}O_{2.95}$,
$Sn_{0.8}Fe_{0.2}Ca_{0.1}P_{0.9}O_{3.35}$,
$Sn_{0.3}Fe_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$,
$Sn_{0.7}Pb_{0.3}Ca_{0.1}P_{0.9}O_{3.35}$,
$Sn_{0.2}Ge_{0.8}Ba_{0.1}P_{0.9}O_{3.35}$,
$SnMg_{0.05}B_{0.45}O_{1.73}$, $SnCa_{0.05}P_{0.45}O_{2.18}$,
$SnBa_{0.1}B_{0.2}P_{0.2}O_{1.9}$, $SnCa_{0.15}B_{1.45}O_{3.13}$,
$SnMg_{0.15}P_{1.45}O_{4.53}$, $SnBa_{0.3}B_{0.6}P_{0.6}O_{3.7}$,
$SnBa_{0.1}B_{0.9}O_{2.45}$, $SnCa_{0.1}P_{0.9}O_{3.35}$,
$SnMg_{0.2}B_{0.4}P_{0.4}O_{2.8}$,
$Sn_{1.6}B_{0.4}P_{0.4}Ca_{0.2}O_{3.4}$,
$Sn_{1.3}B_{0.4}P_{0.4}Ca_{0.2}O_{3.1}$,
$Sn_{1.6}B_{0.4}P_{0.4}Ba_{0.2}O_{3.4}$,
$Sn_{1.3}B_{0.4}P_{0.4}Ba_{0.2}O_{3.1}$,
$Sn_{1.6}B_{0.4}P_{0.4}Mg_{0.2}O_{3.4}$,
$Sn_{1.6}Al_{0.1}B_{0.3}P_{0.4}Ca_{0.2}O_{3.4}$,
$Sn_{1.3}Al_{0.1}B_{0.3}P_{0.4}Ca_{0.2}O_{3.1}$,
$Sn_{1.6}Al_{0.1}B_{0.3}P_{0.4}Ba_{0.2}O_{3.4}$,
$Sn_{1.3}Al_{0.1}B_{0.3}P_{0.4}Ba_{0.2}O_{3.1}$,
$Sn_{1.6}Al_{0.1}B_{0.3}P_{0.4}Mg_{0.2}O_{3.4}$,
$Sn_{1.6}B_{0.4}P_{0.4}K_{0.2}O_{3.3}$,
$Sn_{1.3}B_{0.4}P_{0.4}K_{0.2}O_3$,
$Sn_{1.0}B_{0.4}P_{0.4}K_{0.2}O_{2.7}$,
$Sn_{1.6}B_{0.4}P_{0.4}Na_{0.2}O_{3.3}$,
$Sn_{1.2}B_{0.4}P_{0.4}Na_{0.2}O_{2.9}$,
$Sn_{1.0}B_{0.4}P_{0.4}Na_{0.2}O_{2.7}$,
$Sn_{1.6}B_{0.4}P_{0.4}Rb_{0.2}O_{3.3}$,
$Sn_{1.3}B_{0.4}P_{0.4}Rb_{0.2}O_3$,
$Sn_{1.0}B_{0.4}P_{0.4}Rb_{0.2}O_{2.7}$,
$Sn_{1.4}B_{0.4}P_{0.4}Cs_{0.2}O_{3.1}$,
$Sn_{1.2}B_{0.4}P_{0.4}Cs_{0.2}O_{2.9}$,
$Sn_{1.0}B_{0.4}P_{0.4}Cs_{0.2}O_{2.7}$,
$Sn_{1.2}B_{0.4}P_{0.4}Ba_{0.1}K_{0.1}O_{2.95}$,
$Sn_{1.3}B_{0.4}P_{0.4}Ba_{0.1}Cs_{0.1}O_{3.05}$,
$Sn_{1.3}B_{0.4}P_{0.4}Ca_{0.1}K_{0.1}O_{3.05}$,
$Sn_{1.3}B_{0.4}P_{0.4}Ca_{0.1}Rb_{0.1}O_{3.05}$,
$Sn_{1.6}Al_{0.1}B_{0.3}P_{0.4}K_{0.2}O_{3.3}$,
$Sn_{1.3}Al_{0.1}B_{0.3}P_{0.4}K_{0.2}O_3$,
$Sn_{1.0}Al_{0.1}B_{0.3}P_{0.4}K_{0.2}O_{2.7}$,
$Sn_{1.6}Al_{0.1}B_{0.3}P_{0.4}Na_{0.2}O_{3.3}$,
$Sn_{1.3}Al_{0.1}B_{0.3}P_{0.4}Na_{0.2}O_3$,
$Sn_{1.0}Al_{0.1}B_{0.3}P_{0.4}Na_{0.2}O_{2.7}$,
$Sn_{1.6}Al_{0.1}B_{0.3}P_{0.4}Rb_{0.2}O_{3.3}$,
$Sn_{1.3}Al_{0.1}B_{0.3}P_{0.4}Rb_{0.2}O_3$,
$Sn_{1.0}Al_{0.1}B_{0.3}P_{0.4}Rb_{0.2}O_{2.7}$,
$Sn_{1.6}Al_{0.1}B_{0.3}P_{0.4}Cs_{0.2}O_{3.3}$,
$Sn_{1.2}Al_{0.1}B_{0.3}P_{0.4}Cs_{0.2}O_{2.9}$,
$Sn_{1.0}Al_{0.1}B_{0.3}P_{0.4}Cs_{0.2}O_{2.7}$,
$Sn_{1.3}Al_{0.1}B_{0.3}P_{0.4}Ba_{0.1}K_{0.1}O_{3.05}$,
$Sn_{1.3}Al_{0.1}B_{0.3}P_{0.4}Ba_{0.1}Cs_{0.1}O_{3.05}$,
$Sn_{1.2}Al_{0.1}B_{0.3}P_{0.4}Ca_{0.1}K_{0.1}O_{2.95}$,
$Sn_{1.3}Al_{0.1}B_{0.3}P_{0.4}Ca_{0.1}Rb_{0.1}O_{3.05}$,
$Sn_{1.6}Al_{0.1}B_{0.3}P_{0.4}La_{0.2}O_{3.5}$,
$Sn_{1.0}B_{0.4}P_{0.4}Y_{0.2}O_{2.9}$,
$Sn_{1.6}Al_{0.1}B_{0.3}P_{0.4}Y_{0.2}O_{3.5}$,
$Sn_{1.0}B_{0.4}P_{0.4}La_{0.2}O_{2.9}$,
$SnB_{0.2}P_{0.2}F_{0.1}O_{1.75}$,
$SnB_{0.6}P_{0.6}F_{0.3}O_{3.25}$,
$SnB_{0.4}P_{0.4}F_{0.2}O_{2.5}$,
$SnAl_{0.2}B_{0.4}P_{0.6}F_{0.3}O_{3.25}$,
$Sn_{1.4}B_{0.4}P_{0.4}Mg_{0.2}F_{0.2}O_{3.1}$,
$Sn_{1.4}Al_{0.1}B_{0.3}P_{0.4}Ca_{0.2}F_{0.2}O_{3.1}$,
$Sn_{1.2}Al_{0.1}B_{0.3}P_{0.4}Ca_{0.2}F_{0.2}O_{2.9}$,
$Sn_{1.4}Al_{0.1}B_{0.3}P_{0.4}Ba_{0.2}F_{0.2}O_{3.1}$

In yet another preferred embodiment of the invention, the negative electrode material consists mainly of an amorphous oxide containing Sn and Ge as functional elements. While excellent performance can be obtained from the functional element Sn alone, a combination of Sn and Ge provides a further improvement particularly in charge and discharge cycle characteristics.

In particular, the negative electrode material is preferably an amorphous composite oxide represented by formula (6):

$$SnGe_fM^8_gM^4_hO_x \qquad (6)$$

wherein $M^8$ represents at least one of Al, B, and P; $M^4$ represents at least one of elements of the groups 1, 2 and 3 of the Periodic Table and halogen elements; f represents a number of 0.001 to 1; g represents a number of 0.2 to 2; h represents a number of 0.01 to 1; and x represents a number of 1.3 to 7.

Still preferably, the negative electrode material is an amorphous composite oxide represented by formula (7):

$$SnGe_fM^8_gM^9_hO_x \qquad (7)$$

wherein $M^8$ represents at least one of Al, B, and P; $M^9$ represents at least one of K, Na, Rb, Cs, Ca, Mg, Ba, and F; f represents a number of 0.001 to 1; g represents a number of 0.2 to 2; h represents a number of 0.01 to 1; and x represents a number of 1.3 to 7.

Still more preferably, the negative electrode material is an amorphous composite oxide represented by formula (8):

$$SnGe_fM^8_gM^{10}_hO_x \qquad (8)$$

wherein $M^8$ represents at least one of Al, B, and P; $M^{10}$ represents at least one of K, Rb, Cs, and Mg; f represents a number of 0.001 to 1; g represents a number of 0.2 to 2; h represents a number of 0.01 to 1; and x represents a number of 1.3 to 7.

Most preferably, the negative electrode material is an amorphous composite oxide represented by formula (9):

$$SnGe_iM^8_jM^{10}_kO_w \qquad (9)$$

wherein $M^8$ represents at least one of Al, B, and P; $M^{10}$ represents at least one of K, Rb, Cs, and Mg; i represents a number of 0.01 to 0.5; j represents a number of 0.4 to 1.3; k represents a number of 0.05 to 0.5; and w represents a number of 1.3 to 6.

The ratio of Ge to Sn is 0.001 to 1, preferably 0.002 to 0.7, particularly 0.01 to 0.5. At a smaller ratio, the effect of the combined use of Ge is not manifested. At a larger ratio, the charge and discharge efficiency deteriorates.

$M^8$ and $M^4$ in formula (6) are used as amorphous solid-forming elements. These elements facilitate obtaining an amorphous oxide. Use of both $M^8$ and $M^4$ makes amorphous solid formation more easier. That is, $M^8$, which is at least one element selected from Al, P, and B, and $M^4$, which is at least one element selected from elements of the groups 1, 2 and 3 of the Periodic Table and halogen elements, are combined.

Of the elements of the groups 1, 2 and 3 of the Periodic Table and halogen elements preferred are K, Na, Rb, Cs, Ca, Mg, Ba, and F. Among them, K, Rb, Cs, and Mg are particularly preferred for obtaining a nonaqueous secondary battery having further improved charge and discharge cycle characteristics.

The ratio of at least one element selected from Al, P and B to Sn is 0.2 to 2, preferably 0.3 to 1.5, still preferably 0.4 to 1.3. At a smaller ratio it is difficult to make the solid amorphous. At a larger ratio the concentrations of the functional elements Sn and Ge in the amorphous solid decrease, which causes a reduction in discharge capacity of the resulting nonaqueous secondary battery. The ratio of at least one element selected from elements of the groups 1, 2 and 3 of the Periodic Table and halogen elements to Sn is 0.01 to 1, preferably 0.03 to 0.8, still preferably 0.05 to 0.5. At a smaller ratio, the effect of the addition is lessened. At a larger ratio, the concentrations of the functional elements Sn and Ge in the amorphous solid decrease, causing a reduction in discharge capacity of the resulting nonaqueous secondary battery.

Specific but non-limiting examples of these compounds are shown below.

$SnGe_{0.001}P_{0.1}B_{0.1}K_{0.5}O_{1.65}$,
$SnGe_{0.001}P_{0.45}B_{0.45}Mg_{0.1}K_{0.1}O_{2.952}$,
$SnGe_{0.005}P_{0.1}B_{0.1}Mg_{0.5}K_{0.5}O_{2.16}$,
$SnGe_{0.01}P_{0.2}K_{0.01}O_{1.525}$,
$SnGe_{0.01}P_{0.1}B_{0.1}K_{0.1}O_{1.47}$,
$SnGe_{0.02}P_{0.3}K_{0.1}O_{1.84}$,
$SnGe_{0.02}P_{0.15}B_{0.15}K_{0.1}O_{1.69}$,
$SnGe_{0.02}P_{0.4}K_{0.1}O_{3.09}$,
$SnGe_{0.02}P_{0.2}B_{0.2}O_{1.84}$,
$SnGe_{0.02}P_{0.5}K_{0.1}O_{2.34}$,
$SnGe_{0.02}P_{0.25}B_{0.25}K_{0.1}O_{2.09}$,
$SnGe_{0.02}P_{0.6}K_{0.1}O_{2.5}$,
$SnGe_{0.02}P_{0.3}B_{0.3}K_{0.1}Mg_{0.2}O_{2.49}$,
$SnGe_{0.02}P_{0.7}K_{0.1}O_{2.84}$,
$SnGe_{0.02}P_{0.5}B_{0.2}K_{0.1}O_{2.64}$,
$SnGe_{0.02}P_{0.4}B_{0.3}K_{0.1}O_{d2.54}$,
$SnGe_{0.05}P_{0.3}B_{0.4}K_{0.1}O_{2.5}$,
$SnGe_{0.05}P_{0.8}K_{0.1}O_{3.15}$,
$SnGe_{0.05}P_{0.6}B_{0.2}K_{0.1}O_{3.45}$,
$SnGe_{0.05}P_{0.4}B_{0.4}K_{0.1}O_{2.75}$,
$SnGe_{0.05}P_{0.2}B_{0.6}K_{0.1}O_{2.55}$,
$SnGe_{0.05}P_{0.4}B_{0.4}K_{0.1}Mg_{0.1}O_{2.85}$,
$SnGe_{0.05}P_{0.6}B_{0.2}Mg_{0.1}K_{0.1}O_{3.05}$,
$SnGe_{0.05}P_{0.3}B_{0.5}Mg_{0.1}K_{0.1}O_{2.9}$,
$SnGe_{0.05}P_{0.6}B_{0.3}Mg_{0.1}K_{0.1}O_{3.8}$,
$SnGe_{0.05}P_{0.45}B_{0.45}K_{0.2}O_{3.0}$,
$SnGe_{0.05}P_{0.45}B_{0.45}Mg_{0.1}K_{0.1}O_{3.14}$,
$SnGe_{0.05}P_{0.45}B_{0.45}K_{0.1}Mg_{0.1}Al_{0.05}O_{3.125}$,
$SnGe_{0.05}P_{0.4}B_{0.5}Mg_{0.1}K_{0.1}O_3$,
$SnGe_{0.05}P_{0.6}B_{0.4}K_{0.1}O_{3.25}$,
$SnGe_{0.05}P_{0.6}B_{0.4}Mg_{0.1}K_{0.1}O_{3.35}$,
$SnGe_{0.05}P_{0.6}B_{0.4}Cs_{0.1}O_{3.25}$,
$SnGe_{0.05}P_{0.5}B_{0.5}K_{0.1}O_{3.15}$,
$SnGe_{0.05}P_{0.5}B_{0.5}Mg_{0.1}K_{0.1}O_{3.25}$,
$SnGe_{0.05}P_{0.5}B_{0.5}Al_{0.1}K_{0.1}O_{3.3}$,
$SnGe_{0.05}P_{0.5}B_{0.5}Mg_{0.01}O_{3.101}$,
$SnGe_{0.05}P_{0.5}B_{0.5}Al_{0.05}Mg_{0.1}K_{0.1}O_{3.325}$,
$SnGe_{0.05}P_{0.5}B_{0.5}Cs_{0.1}O_{3.105}$,
$SnGe_{0.05}P_{0.5}B_{0.5}Cs_{0.05}K_{0.05}O_{3.15}$,
$SnGe_{0.05}P_{0.5}B_{0.5}K_{0.5}Cs_{0.5}O_{3.6}$,
$SnGe_{0.05}P_{0.4}B_{0.6}K_{0.1}O_{2.9}$,
$SnGe_{0.05}P_{0.4}B_{0.6}K_{0.1}Mg_{0.1}O_{3.15}$,
$SnGe_{0.05}P_{0.4}B_{0.6}K_{0.1}Al_{0.02}O_{3.03}$,
$SnGe_{0.05}P_{0.4}B_{0.6}Cs_{0.1}O_{3.05}$,
$SnGe_{0.05}P_{0.4}B_{0.6}K_{0.2}O_{3.06}$,
$SnGe_{0.05}P_{0.4}B_{0.6}Rb_{0.1}O_{3.05}$,
$SnGe_{0.05}P_{0.3}B_{0.7}K_{0.1}Mg_{0.1}O_{3.05}$,
$SnGe_{0.05}P_{0.1}B_{0.9}K_{0.2}Mg_{0.1}O_{2.8}$,
$SnGe_{0.05}P_{0.1}B_{0.9}Mg_{0.4}O_{3.1}$,
$SnGe_{0.05}P_{1.1}K_{0.1}O_{3.9}$,
$SnGe_{0.05}P_{0.7}B_{0.4}K_{0.1}Mg_{0.1}O_{3.6}$,
$SnGe_{0.05}P_{0.6}B_{0.5}K_{0.1}Mg_{0.1}O_{3.6}$,
$SnGe_{0.05}P_{0.5}B_{0.6}Cs_{0.1}O_{3.3}$,
$SnGe_{0.05}P_{0.4}B_{0.7}K_{0.2}O_{3.25}$,
$SnGe_{0.05}P_{0.4}B_{0.7}K_{0.1}Mg_{0.1}O_{3.3}$, $SnGe_{0.05}P_{1.2}K_{0.1}Mg_{0.1}O_{4.25}$,
$SnGe_{0.05}P_{0.6}B_{0.6}K_{0.1}Mg_{0.1}O_{3.65}$,
$SnGe_{0.1}P_{0.9}K_{0.1}O_{3.5}$,
$SnGe_{0.1}P_{0.7}B_{0.2}K_{0.1}Mg_{0.1}O_{3.3}$,
$SnGe_{0.1}P_{0.6}B_{0.3}Mg_{0.1}K_{0.1}O_{3.3}$,
$SnGe_{0.1}P_{0.45}B_{0.45}K_{0.1}O_{3.05}$,
$SnGe_{0.1}P_{0.45}B_{0.45}K_{0.2}O_{3.1}$,
$SnGe_{0.1}P_{0.45}B_{0.45}Mg_{0.1}K_{0.1}O_{3.15}$,
$SnGe_{0.1}P_{0.45}B_{0.45}K_{0.1}Mg_{0.1}Al_{0.05}O_{3.225}$,
$SnGe_{0.1}P_{0.4}B_{0.5}Mg_{0.1}K_{0.1}O_{3.1}$,
$SnGe_{0.1}PK_{0.1}Mg_{0.2}O_{4.05}$,
$SnGe_{0.1}P_{0.6}B_{0.4}K_{0.1}O_{3.35}$,
$SnGe_{0.1}P_{0.6}B_{0.4}Mg_{0.1}K_{0.1}O_{3.45}$,
$SnGe_{0.1}P_{0.6}B_{0.4}Cs_{0.1}O_{3.35}$,
$SnGe_{0.1}P_{0.5}B_{0.5}K_{0.1}O_{3.25}$,
$SnGe_{0.1}P_{0.5}B_{0.5}Mg_{0.1}K_{0.1}O_{3.35}$,
$SnGe_{0.1}P_{0.5}B_{0.5}Al_{0.1}K_{0.1}O_{2.4}$,
$SnGe_{0.1}P_{0.5}B_{0.5}Ba_{0.05}K_{0.1}O_{2.3}$,
$SnGe_{0.1}P_{0.5}B_{0.5}Pb_{0.05}K_{0.1}O_{2.3}$,
$SnGe_{0.1}P_{0.5}B_{0.5}Mg_{0.05}K_{0.15}O_{3.325}$,
$SnGe_{0.1}P_{0.5}B_{0.5}Mg_{0.2}K_{0.05}O_{3.425}$,
$SnGe_{0.1}P_{0.5}B_{0.5}Mg_{0.01}O_{3.201}$,
$SnGe_{0.1}P_{0.5}B_{0.5}Al_{0.05}Mg_{0.1}K_{0.1}O_{3.425}$,
$SnGe_{0.1}P_{0.5}B_{0.5}Cs_{0.1}O_{3.205}$,
$SnGe_{0.1}P_{0.5}B_{0.5}Mg_{0.1}Li_{0.1}O_{3.35}$,
$SnGe_{0.1}P_{0.5}B_{0.5}Na_{0.1}O_{3.205}$,
$SnGe_{0.1}P_{0.5}B_{0.5}Rb_{0.1}O_{3.205}$,
$SnGe_{0.1}P_{0.5}B_{0.5}K_{0.1}Ca_{0.05}O_{3.275}$,
$SnGe_{0.1}P_{0.5}B_{0.5}Mg_{0.1}K_{0.1}F_{0.1}O_{3.25}$,
$SnGe_{0.1}P_{0.5}B_{0.5}K_{0.1}Sc_{0.02}O_{3.28}$,
$SnGe_{0.1}P_{0.5}B_{0.5}Mg_{0.1}K_{0.1}Y_{0.01}O_{3.365}$,
$SnGe_{0.1}P_{0.5}B_{0.5}Cs_{0.05}K_{0.05}O_{3.25}$,
$SnGe_{0.1}P_{0.5}B_{0.5}Mg_{0.1}K_{0.4}Cs_{0.4}O_{3.7}$,
$SnGe_{0.1}P_{0.5}B_{0.5}K_{0.5}Cs_{0.5}O_{3.7}$,
$SnGe_{0.1}P_{0.4}B_{0.6}K_{0.1}O_{3.15}$,
$SnGe_{0.1}P_{0.4}B_{0.6}K_{0.1}Mg_{0.1}O_{3.25}$,
$SnGe_{0.1}P_{0.4}B_{0.6}K_{0.1}Al_{0.02}O_{3.18}$,
$SnGe_{0.1}P_{0.4}B_{0.6}Cs_{0.1}O_{3.15}$,
$SnGe_{0.1}P_{0.4}B_{0.6}K_{0.2}O_{3.16}$,
$SnGe_{0.1}P_{0.4}B_{0.6}Rb_{0.1}O_{3.15}$,
$SnGe_{0.1}P_{0.3}B_{0.7}K_{0.1}Mg_{0.1}O_{2.15}$,
$SnGe_{0.1}P_{0.3}B_{0.7}K_{0.15}Mg_{0.05}O_{2.125}$,
$SnGe_{0.1}P_{0.3}B_{0.7}Cs_{0.1}O_{2.05}$,
$SnGe_{0.1}P_{0.1}B_{0.9}K_{0.2}Mg_{0.1}O_{2.9}$,
$SnGe_{0.1}P_{0.1}B_{0.9}Mg_{0.4}O_{3.2}$,
$SnGe_{0.1}P_{1.1}K_{0.1}O_{4}$,
$SnGe_{0.1}P_{0.7}B_{0.4}K_{0.1}Mg_{0.1}O_{3.7}$,
$SnGe_{0.1}P_{0.6}B_{0.5}K_{0.1}Mg_{0.1}O_{3.7}$,
$SnGe_{0.1}P_{0.5}B_{0.6}K_{0.1}Al_{0.02}O_{3.43}$,
$SnGe_{0.1}P_{0.5}B_{0.6}K_{0.1}Ba_{0.05}O_{3.45}$,
$SnGe_{0.1}P_{0.5}B_{0.6}Cs_{0.05}O_{3.335}$,
$SnGe_{0.1}P_{0.5}B_{0.6}Cs_{0.1}O_{3.4}$,
$SnGe_{0.1}P_{0.5}B_{0.6}Cs_{0.05}K_{0.05}O_{3.4}$,
$SnGe_{0.1}P_{0.4}B_{0.7}K_{0.2}O_{3.35}$,
$SnGe_{0.1}P_{0.4}B_{0.7}K_{0.1}Mg_{0.1}O_{3.4}$,
$SnGe_{0.1}P_{1.2}K_{0.1}Mg_{0.1}O_{4.35}$,
$SnGe_{0.1}P_{0.6}B_{0.6}K_{0.1}Mg_{0.1}O_{3.75}$,
$SnGe_{0.1}P_{1.5}K_{0.2}Mg_{0.1}O_{5.15}$,
$SnGe_{0.2}P_{0.7}B_{0.2}K_{0.1}Mg_{0.1}O_{3.5}$,
$SnGe_{0.2}P_{0.6}B_{0.3}Mg_{0.1}K_{0.1}O_{3.5}$,
$SnGe_{0.2}P_{0.45}B_{0.45}K_{0.1}O_{3.25}$,
$SnGe_{0.2}P_{0.45}B_{0.45}K_{0.2}O_{3.3}$,
$SnGe_{0.2}P_{0.45}B_{0.45}Mg_{0.1}K_{0.1}O_{3.35}$,
$SnGe_{0.2}P_{0.45}B_{0.45}K_{0.1}Mg_{0.1}Al_{0.05}O_{3.425}$,
$SnGe_{0.2}P_{0.4}B_{0.5}Mg_{0.1}K_{0.1}O_{3.3}$,
$SnGe_{0.2}PK_{0.1}Mg_{0.2}O_{4.25}$,
$SnGe_{0.2}P_{0.6}B_{0.4}K_{0.1}O_{3.55}$,
$SnGe_{0.2}P_{0.6}B_{0.4}Mg_{0.1}K_{0.1}O_{3.65}$,
$SnGe_{0.2}P_{0.6}B_{0.4}Cs_{0.1}O_{3.55}$,
$SnGe_{0.2}P_{0.5}B_{0.5}K_{0.1}O_{3.45}$,
$SnGe_{0.2}P_{0.5}B_{0.5}Mg_{0.1}K_{0.1}O_{3.55}$,
$SnGe_{0.2}P_{0.5}B_{0.5}Al_{0.1}K_{0.1}O_{3.6}$,
$SnGe_{0.2}P_{0.5}B_{0.5}Mg_{0.05}K_{0.15}O_{3.525}$,
$SnGe_{0.2}P_{0.5}B_{0.5}Mg_{0.01}O_{3.401}$,
$SnGe_{0.2}P_{0.5}B_{0.5}Al_{0.05}Mg_{0.1}K_{0.1}O_{3.625}$,
$SnGe_{0.2}P_{0.5}B_{0.5}Cs_{0.1}O_{3.405}$,
$SnGe_{0.2}P_{0.5}B_{0.5}Cs_{0.05}K_{0.05}O_{3.45}$,
$SnGe_{0.2}P_{0.5}B_{0.5}K_{0.5}Cs_{0.5}O_{3.9}$,
$SnGe_{0.2}P_{0.4}B_{0.6}K_{0.1}O_{3.35}$,
$SnGe_{0.2}P_{0.4}B_{0.6}K_{0.1}Mg_{0.1}O_{3.45}$,
$SnGe_{0.2}P_{0.4}B_{0.6}K_{0.1}Al_{0.02}O_{3.38}$,
$SnGe_{0.2}P_{0.4}B_{0.6}Cs_{0.1}O_{3.35}$,
$SnGe_{0.2}P_{0.4}B_{0.6}K_{0.2}O_{3.36}$,
$SnGe_{0.2}P_{0.4}B_{0.6}Rb_{0.1}O_{3.35}$,
$SnGe_{0.2}P_{0.3}B_{0.7}K_{0.1}Mg_{0.1}O_{2.35}$,
$SnGe_{0.2}P_{0.1}B_{0.9}K_{0.2}Mg_{0.1}O_{3.1}$,
$SnGe_{0.2}P_{0.1}B_{0.9}Mg_{0.4}O_{3.4}$,
$SnGe_{0.2}P_{1.1}K_{0.1}O_{4.2}$,
$Ge_{0.2}P_{0.7}B_{0.4}K_{0.1}Mg_{0.1}O_{3.9}$,
$SnGe_{0.2}P_{0.6}B_{0.5}K_{0.1}Mg_{0.1}O_{3.9}$,
$SnGe_{0.2}P_{0.5}B_{0.6}Cs_{0.05}O_{3.535}$,
$SnGe_{0.2}P_{0.5}B_{0.6}Cs_{0.1}O_{3.6}$,
$SnGe_{0.2}P_{0.4}B_{0.7}K_{0.2}O_{3.55}$,
$SnGe_{0.2}P_{0.4}B_{0.7}K_{0.1}Mg_{0.1}O_{3.6}$,
$SnGe_{0.2}P_{1.2}K_{0.1}Mg_{0.1}O_{4.55}$,
$SnGe_{0.2}P_{0.6}B_{0.6}K_{0.1}Mg_{0.1}O_{3.95}$,
$SnGe_{0.5}P_{0.7}B_{0.8}K_{0.2}Mg_{0.2}O_{5.25}$,
$SnGe_{0.6}P_{0.8}B_{0.8}Cs_{0.1}O_{5.45}$,
$SnGe_{0.7}P_{1.8}K_{0.2}O_{7}$,
$SnGe_{0.8}P_{0.9}B_{0.9}K_{0.2}Mg_{0.4}O_{6.7}$,
$SnGe_{1}P_{1}B_{1}Cs_{0.1}O_{7.05}$,
$SnGe_{1}P_{0.4}As_{0.1}B_{0.1}K_{0.1}Mg_{0.1}O_{4.45}$,
$SnGe_{0.07}P_{0.5}B_{0.5}Cs_{0.1}O_{3.19}$,
$SnGe_{0.07}P_{0.5}B_{0.5}K_{0.1}Mg_{0.1}O_{3.29}$

The negative electrode material for use in the invention is substantially amorphous at the time of battery assembly. The term "substantially amorphous" as used herein means having a broad scatter band having a peak at 2θ of 20° to 40° in X-ray diffractometry using CuKα rays. The "substantially amorphous" substance as defined above may have a diffraction line attributed to crystalline structure. The substantially amorphous substance preferably has such a diffraction pattern that the maximum intensity of the crystalline diffraction line observed at 2θ of 40° to 70° is not more than 500 times, still preferably not more than 100 times, particularly not more than 5 times, the intensity of the peak of the broad scatter band which is observed at 2θ of 20° to 40°. Most preferably, the negative electrode material exhibits no crystalline diffraction line.

The amorphous composite oxides of the invention can be synthesized by a calcination method or a solution method. A calcination method is preferred. The method for synthesizing the amorphous composite oxides will be explained in detail by referring to the calcination method for an instance. The calcination method is preferably conducted by sufficiently mixing oxides or compounds of the elements in formula (1), (2) or (3) and calcining the mixture to obtain an amorphous composite oxide. The raw material compounds and conditions of calcination are described below.

Examples of the Sn compounds include SnO, $Sn_2O_3$, $Sn_3O_4$, stannous hydroxide, stannous acid, stannous oxalate, stannous phosphate, orthostannic acid, metastannic acid, parastannic acid, stannous fluoride, stannous chloride, stannous bromide, stannous iodide, tin selenide, tin telluride, stannous pyrophosphate, tin phosphate, and stannous sulfide.

Examples of the Ge compounds, Fe compounds, Mn compounds, and Pb compounds include oxides, chlorides, carbonates, nitrates, acetates and organometallic salts similarly to the Sn compounds.

Examples of the P compounds include phosphorus pentoxide, phosphorus oxychloride, phosphorous pentachloride, phosphorus trichloride, tribromo phosphate, trimethyl phosphate, triethyl phosphate, tripropyl phosphate, stannous pyrophosphate, and boron phosphate.

Examples of the B compounds include boron dioxide, boron trichloride, boron tribromide, boron carbide, boric acid, trimethyl borate, triethyl borate, tripropyl borate, tributyl borate, boron phosphide, and boron phosphate.

Examples of the Al compounds include aluminum oxide ($\alpha$-alumina or $\beta$-alumina), aluminum silicate, aluminum triisopropoxide, aluminum telluride, aluminum chloride, aluminum borate, aluminum phosphide, aluminum phosphate, aluminum lactate, aluminum borate, aluminum sulfide, aluminum sulfate, and aluminum boride.

Examples of the compounds of the group 1 to 3 elements of the Periodic Table include oxides, hydroxides, halides, salts with organic acids, e.g., acetic acid and tartaric acid, and salts with inorganic acids, e.g., hydrochloric acid and phosphoric acid. Mg compounds, for instance, include magnesium chloride, magnesium acetate, magnesium oxide, magnesium oxalate, magnesium hydroxide, magnesium stannate, magnesium pyrophosphate, magnesium fluoride, magnesium borofluoride, and magnesium phosphate.

Examples of the F compounds include tin fluoride, magnesium fluoride, aluminum fluoride, zinc fluoride, indium fluoride, germanium fluoride, iron fluoride, and titanium fluoride.

Calcination is carried out preferably at a rate of temperature rise of 5° to 200° C./min, still preferably 7° to 200° C./min, particularly preferably 10° to 200° C./min; at a calcination temperature of 500° to 1500° C., still preferably 600° to 1500° C., particularly preferably 700° to 1500° C.; for a period of 1 to 100 hours, still preferably 1 to 70 hours, particularly preferably 1 to 20 hours. After calcination, the system is cooled preferably at a rate of temperature drop of 2° to $10^{7°}$ C./min, still preferably 5° to $10^{7°}$ C./min, particularly preferably 10° to $10^{7°}$ C./min.

The term "rate of temperature rise" as used herein means an average rate of temperature rise from 50% of the calcination temperature (°C.) up to 80% of the calcination temperature (°C.), and the term "rate of temperature drop" as used herein means an average rate of temperature drop from 80% of the calcination temperature (°C.) to 50% of the calcination temperature (°C.).

Cooling of the calcined product may be effected either within a calcining furnace or out of the furnace, for example, by pouring the product into water. Super-quenching methods described in *Ceramics Processing*, p. 217, Gihodo (1987), such as a gun method, a Hammer-Anvil method, a slap method, a gas atomizing method, a plasma spray method, a centrifugal quenching method, and a melt drag method, can also be used. Further, cooling may be conducted by a single roller method or a twin roller method described in *New Glass Handbook*, p. 172, Maruzen (1991). Where the material melts during calcination, the calcined product may be withdrawn continuously while feeding the raw materials to the furnace. The melt is preferably stirred during calcination.

The calcining atmosphere preferably has an oxygen content of not more than 5% by volume. An inert gas atmosphere is still preferred. Examples of the inert gas includes nitrogen, argon, helium, krypton, and xenon. Pure argon is particularly preferred.

After calcination and cooling, the amorphous oxide of the invention is taken out as a mass and ground to powder. The ground amorphous oxide usually has a broad particle size distribution. It has turned out that existence of coarse particles or microfine particles gives rise to problems. That is, coarse particles tend to scratch a separator to cause a short circuit or a reduction in capacity during storage, and if microfine particles exist, cycle characteristics deteriorate and the negative electrode material mixture tends to peel off the current collector. A preferred particle size distribution of the negative electrode material for use in the invention is explained below.

The method of measuring particle size includes a sieving method in which particles are dispersed in an appropriate dispersing medium, passing the dispersion through a sieve of appropriate size, and weighing the residue on the sieve, microscopy with an optical microscope or an electron microscope, a light scattering method, laser diffractometry, and the like. It is preferable to select a proper method according to the size range of the particles.

The compound for use in the invention preferably has an average particle size of 0.1 to 60 $\mu$m. It is preferable that the proportion of particles having a particle size of 25 to 100 $\mu$m is 0 to 10 wt %, and that of particles having a particle size of 0.01 to 1 $\mu$m is 0.01 to 5 wt %. It is still preferable that the proportion of particles having a particle size of 25 to 100 $\mu$m is 0 to 5 wt %, and that of particles having a particle size of 0.01 to 1 $\mu$m is 0.01 to 3 wt %. It is particularly preferable that the proportion of particles having a particle size of 25 to 100 $\mu$m is 0 to 3 wt %, and that of particles having a particle size of 0.01 to 1 $\mu$m is 0.01 to 2 wt %.

Grinding of the calcined mass to a prescribed size is carried out by means of well-known grinding machines or classifiers, such as a mortar, a ball mill, a sand mill, a vibration ball mill, a satellite ball mill, a planetary ball mill, spinning air flow type jet mill, and a sieve. If necessary, wet grinding using water or an organic solvent, such as methanol, may be conducted. The grinds are preferably classified to obtain a desired particle size either by dry or wet classification by means of a sieve, an air classifier, etc.

In the present invention, use of the above-described compounds as a negative electrode material provides a nonaqueous secondary battery having improved charge and discharge cycle characteristics, an increased discharge voltage, and an increased capacity, particularly excellent effects of the invention can be obtained by using, as a negative electrode active material, an amorphous compound containing Sn existing in the divalent state. The valence of Sn can be determined through chemical titration, for example, according to the method described in *Physics and Chemistry of Glasses*, Vol. 8, No. 4, p. 165 (1967). It is also decided from the Knight Sift in the solid nuclear magnetic resonance (NMR) spectrum of Sn. For example, in broad-line NMR measurement, metallic Sn (zero valent Sn) shows a peak in an extremely low magnetic field in the vicinity of 7000 ppm with reference to $Sn(Ch_3)_4$, whereas the peak of SnO (divalent Sn) appears around 100 ppm, and that of $SnO_2$ (tetravalent Sn) appears around −600 ppm. Like this, the Knight Sift largely depends on the valence of the center metal Sn, with the ligands being the same. The valence can thus be determined by the peak position obtained by $^{119}$Sn-NMR analysis.

The positive electrode active material which can be used in the invention may be a transition metal oxide capable of reversibly intercalating and deintercalating lithium ions but is preferably a lithium-containing transition metal oxide. Examples of the lithium-containing transition metal oxides that are preferred for use as a positive electrode active material in the invention include lithium-containing oxides containing Ti, V, Cr, Mn, Fe, Co, Ni, Cu, Mo or W. The oxide may contain other alkali metals (the group IA and IIA elements of the Periodic Table) and/or Al, Ga, In, Ge, Sn, Pb, Sb, Bi, Si, P, B, etc. The ratio of these additional elements is preferably 0 to 30 mol % based on the transition metals.

The preferred Li-containing transition metal oxides as a positive electrode active material are those prepared from a mixture of a lithium compound and at least one transition metal compound (the "transition metal" is at least one element selected from Ti, V, Cr, Mn, Fe, Co, Ni, Mo, and W) at a lithium compound/total transition metal compounds molar ratio of 0.3 to 2.2.

Still preferred are those synthesized from a mixture of a lithium compound and at least one transition metal compound (the "transition metal" is at least one element selected from V, Cr, Mn, Fe, Co, and Ni) at a lithium compound/total transition metal compounds molar ratio of from 0.3 to 2.2.

Particularly preferred are those represented by formula $Li_lQO_v$ (wherein at least part of Q represents a transition metal(s) at least one of which is selected from Co, Mn, Ni, V, and Fe; l=0.2 to 1.2; v=1.4 to 3). Q may contain Al, Ga, In, Ge, Sn, Pb, Sb, Bi, Si, P, B, etc. in addition to the transition metals in a proportion of 0 to 30 mol % based on the transition metals.

The preferred lithium-containing metal oxide positive electrode active materials which can be used in the present invention include $Li_ACoO_2$, $Li_ANiO_2$, $Li_AMnO_2$, $Li_ACo_BNi_{1-B}O_2$, $Li_ACo_DV_{1-D}O_F$, $Li_ACo_DFe_{1-D}O_2$, $Li_AMn_2O_4$, $Li_AMn_ECo_{2-E}O_4$, $Li_AMn_ENi_{2-E}O_4$, $Li_AMn_EV_{2-E}O_4$, $Li_AMn_EFe_{2-E}O_4$, a mixture of $Li_AMn_2O_4$ and $MnO_2$, a mixture of $Li_{2A}MnO_3$ and $MnO_2$, a mixture of $Li_AMn_2O_4$, $Li_{2A}MnO_3$, and $MnO_2$ (wherein A=0.2 to 1.2; B=0.1 to 0.9; D=0.8 to 0.98; E=1.6 to 1.96; and F=2.01 to 5).

Still preferred lithium-containing metal oxide positive electrode active materials for use in the invention include $Li_ACoO_2$, $Li_ANiO_2$, $Li_AMnO_2$, $Li_ACo_BNi_{1-B}O_2$, $Li_ACo_DV_{1-D}O_F$, $Li_ACo_DFe_{1-D}O_2$, $Li_AMn_2O_4$, $Li_AMn_ECo_{2-E}O_4$, $Li_AMn_{E1}Ni_{2-E}O_4$, $Li_AMn_EV_{2-E}O_4$, $Li_AMn_EFe_{2-E}O_4$, a mixture of $Li_AMn_2O_4$ and $MnO_2$, a mixture of $Li_{2A}MnO_3$ and $MnO_2$, a mixture of $Li_AMn_2O_4$, $Li_{2A}MnO_3$, and $MnO_2$ (wherein A=0.7 to 1.2; B=0.1 to 0.9; D=0.8 to 0.98; E=1.6 to 196; and F=2.01 to 2.3).

Particularly preferred lithium-containing metal oxide positive electrode active materials for use in the invention include $Li_ACoO_2$, $Li_ANiO_2$, $Li_AMnO_2$, $Li_ACo_BNi_{1-B}O_2$, $Li_ACo_DV_{1-D}O_F$, and $Li_AMn_2O_4$ (wherein A=0.7 to 1.2; B=0.1 to 0.9; D=0.9 to 0.98; F=2.01 to 2.3).

The most preferred lithium-containing metal oxide positive electrode active materials for use in the invention include $Li_ACoO_2$, $Li_ANiO_2$, $Li_AMnO_2$, $Li_ACo_BNi_{1-B}O_2$, $Li_ACo_DV_{1-D}O_F$, and $Li_AMn_2O_4$ (wherein A=0.7 to 1.2; B=0.1 to 0.9; D=0.9 to 0.98; F=2.02 to 2.3).

The value A in the above formulae is the value before commencement of charging and discharging and varies with a charge and a discharge.

The positive electrode active material can be synthesized by mixing a lithium compound and a transition metal compound(s), followed by calcination (calcination method) or by solution reaction. The calcination method is preferred. The calcination temperature is selected from the range in which at least part of the mixed compounds may decompose or melt, for example, from 250° to 2000° C., preferably from 350° to 1500° C. Calcination is preferably preceded by temporary firing at 250 to 900° C. The calcination time is preferably 1 to 72 hours, still preferably 2 to 20 hours. The mixing of the raw materials may be either dry blending or wet blending. The calcination may be followed by annealing at 200 to 900° C.

The calcination gas atmosphere is not particularly limited and may be either oxidizing or reducing. For example, air, a gas having an arbitrarily adjusted oxygen concentration, hydrogen, carbon monoxide, nitrogen, argon, helium, krypton, xenon, carbon dioxide, etc. can be used.

In the synthesis of the positive electrode active material for use in the invention, chemical intercalation of lithium into a transition metal oxide is preferably achieved by reacting a transition metal oxide with metallic lithium, a lithium alloy or butyl lithium.

While not limiting, the positive electrode active material preferably has an average particle size of 0.1 to 50 $\mu$m and a specific surface area of 0.01 to 50 $m^2/g$, measured by a BET method. The supernantant liquid of a solution of 5 g of a positive electrode active material dissolved in 100 ml of distilled water preferably has a pH of 7 to 12.

The resulting positive electrode active material is ground to a prescribed size by means of well-known grinding machines or classifiers, such as a mortar, a ball mill, a vibration ball mill, a satellite ball mill, a planetary ball mill, spinning air flow type jet mill, and a sieve.

The positive electrode active material obtained by calcination may be washed with water, an acid aqueous solution, an alkali aqueous solution, an organic solvent, etc. before use.

The amount of lithium to be intercalated into the negative electrode material is 3 to 10 equivalents, and the ratio of a negative electrode material to a positive electrode active material is decided in conformity with this equivalent amount. It is preferable to use a negative electrode material in an amount based on the calculated ratio multiplied by a coefficient of 0.5 to 2. where a substance other than a positive electrode active material, e.g., metallic lithium, a lithium alloy or butyl lithium, is used as a lithium source, the amount of a positive electrode active material to be used is decided in conformity with the equivalent amount of lithium released from the negative electrode material. In this case, too, the ratio of the amount to be used calculated based on the equivalent amount is preferably multiplied by a coefficient of 0.5 to 2.

The electrolyte used in the invention consists of at least one aprotic organic solvent and at least one lithium salt soluble in the solvent. Examples of the organic solvents include propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters (see JP-A-60-23973), trimethoxymethane (see JP-A-61-4170), dioxolane derviatives (see JP-A-62-15771, JP-A-62-22372, JP-A-62-108474), sulfolane (see JP-A-62-31959), 3-methyl-2-oxazolidinone (JP-A-62-44961), propylene carbonate derivatives (see JP-A-62-290069, JP-A-62-290071), tetrahydrofuran derivatives (see JP-A-63-32872), diethyl ether (see JP-A-63-62166), and 1,3-propanesultone (see JP-A-63-102173). Examples of the lithium salts soluble in these solvents include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$ (see JP-A-57-74974), lower fatty acid salts (see JP-A-60-41773), $LiAlCl_4$, LiCl, LiBr, LiI (see JP-A-60-24765), chloroboran lithium (see JP-A-61-165957), and lithium tetraphenylborate (see JP-A-61-214376). In particular, an electrolyte containing ethylene carbonate is preferred. For example, an electrolyte comprising a mixed solvent of ethylene carbonate and 1,2-dimethoxyethane and/or diethyl carbonate having dissolved therein $LiCF_3SO_3$, $LiClO_4$, $LiBF_4$ and/or $LiPF_6$ is preferred.

The amount of the electrolyte to be used in a battery is not particularly limited and can be selected according to the amounts of the positive electrode active material and the negative electrode material or the size of the battery. The concentration of the supporting electrolyte is preferably 0.2 to 3 mol per liter of the electrolytic solution.

In addition to the electrolytic solution, the following solid electrolytes may also be employed. Solid electrolytes are divided into inorganic solid electrolytes and organic solid electrolytes. Well-known inorganic solid electrolytes include lithium nitride, a lithium halide, and a lithium oxyacid salt. Among them, $Li_3N$, $LiI$, $Li_5NI_2$, $Li_3N$—$LiI$—$LiOH$, $LiSiO_4$, $LiSiO_4$—$LiI$—$LiOH$ (see JP-A-49-81899), $xLi_3PO_4$—$(1-x)Li_4SiO_4$ (see JP-A-59-60866), $Li_2SiS_3$ (see JP-A-60-501731), and phosphorus sulfide compounds (see JP-A-62-82665) are effective.

Examples of effective organic solid electrolytes include polyethylene oxide derivatives or polymers containing the same (see JP-A-63-135447), polypropylene oxide derivatives or polymers containing the same, polymers containing an ionizing group (see JP-A-62-254302, JP-A-62-254303, JP-A-63-193954), a mixture of a polymer containing an ionizing group and the above-mentioned aprotic electrolytic solution (see U.S. Pat. Nos. 4,792,504 and 4,830,939, JP-A-62-22375, JP-A-62-22376, JP-A-63-22375, JP-A-63-22776, JP-A-1-95117), and phosphoric ester polymers (see JP-A-61-256573).

A method of adding polyacrylonitrile to an electrolytic solution (see JP-A-62-278774) and a method of combining an organic solid electrolyte and an inorganic solid electrolyte (see JP-A-60-1768) are also known.

As described above, batteries having a high capacity and satisfactory cycle characteristics are obtained by using the negative electrode material of the invention. However, cases sometimes occur with batteries of high capacity, wherein an abnormal electric current flows due to an external short circuit caused by an error of usage, such as a forced discharge, which leads to such an accident as a considerable increase in inner temperature, a spout of the contents, and a burst of the battery case. Although countermeasures against these accidents, such as incorporation of a safety valve and a current breaking element, e.g., a PTC element, have been taken, they do not furnish an ultimate solution to the problem of heat generation. In this invention, it is desirable for safety improvement to combine the above-described negative electrode material with a specific separator hereinafter described. It is also desirable to provide a protective layer on the positive electrode and/or the negative electrode.

An insulating material having fine pores or interstices and exhibiting high ion permeability and prescribed mechanical strength is used as a separator. For improvement of safety, the material should close the pores or interstices at 80° C. or higher to increase the resistivity thereby to cut off the electric current. The temperature at which the interstices are closed is preferably 90 to 180° C., still preferably 110 to 170° C.

Any known method of providing interstices can be used depending on the material. A porous film usually has circular or elliptical pores having a size of 0.05 to 30 µm, preferably 0.1 to 20 µm. A porous film may have rod-shaped or amorphous pores as formed by stretching or phase separation. Fabric has interstices formed among fibers, the shape of which depends on the method of manufacturing woven fabric or nonwoven fabric. The ratio of the pores or interstices, namely a porosity is 20 to 90%, preferably 35 to 80%.

The separator for use in the invention is a finely porous film, woven fabric or nonwoven fabric having pores or interstices of 5 to 100 µm, preferably 10 to 80 µm, in size.

The separator for use in the invention preferably contains at least 20% by weight, particularly 30% by weight of more, of an ethylene component. Components other than ethylene preferably include propylene, butene, hexene, ethylene fluoride, vinyl chloride, vinyl acetate, and vinyl alcohol acetal, with propylene and ethylene fluoride being particularly preferred.

The finely porous film preferably comprises polyethylene, an ethylene-propylene copolymer, or an ethylene-butene copolymer. The one prepared from a mixed solution of polyethylene and polypropylene or polytetrafluoroethylene is also preferred.

The woven or nonwoven fabric is preferably made of fibers having a fiber diameter of 0.1 to 5 µm and comprising polyethylene, an ethylene-propylene copolymer, an ethylene-butene-1 copolymer, an ethylene-methylbutene copolymer, an ethylene-methylpentene copolymer, polypropylene or polytetrafluoroethylene.

These separator materials may be used either alone or in a composite form thereof. A laminate of two or more finely porous films different in pore size, porosity or temperature for pore closing, a composite material of a finely porous film and nonwoven fabric or woven fabric, and a composite material of nonwoven fabric and paper are particularly preferred.

The separator may contain inorganic fiber, such as a glass fiber or carbon fiber, or particles of inorganic substances, such as silicon dioxide, zeolite, alumina, and talc. The interstices or surfaces of the separator may be made hydrophilic by treatment with a surface active agent.

The protective layer is composed of at least one layer and may be composed of a plurality of layers of the same kind or different kinds. The protective layer has substantially no electron conductivity, that, it is an insulating layer. When the protective layer is formed of a plurality of layers, at lest the outermost layer thereof is insulating. The protective layer preferably has a thickness of 1 to 40 µm, particularly 2 to 30 µm. It is desirable for the protective layer containing the particles not to melt nor form a new film at 300° C. or lower. The protective layer preferably contains insulating organic or inorganic particles. These particles preferably have a size of 0.1 to 20 µm, particularly 0.2 to 15 µm.

Preferred organic particles are a powdered crosslinked latex or fluorine resin which has a glass transition point of 250° to 350° C. and does not decompose nor form a film. Powdered Teflon is still preferred.

Suitable inorganic particles include particles of a carbide, a silicide, a nitride, a sulfide or an oxide of a metal or a nonmetal element.

Of the carbide, silicide and nitride, SiC, aluminum nitride, BN, and BP are preferred for their high insulating properties and chemical stability. SiC obtained by using BeO, Be or BN as a sintering aid is particularly preferred.

Of the calcogenides, oxides are preferred. Those insusceptible to oxidation or reduction are still preferred. Such oxides include $Al_2O_3$, $As_4O_6$, $B_2O_3$, $BaO$, $BeO$, $CaO$, $Li_2O$, $K_2O$, $Na_2O$, $In_2O_3$, $MgO$, $Sb_2O_5$, $SiO_2$, $SrO$, and $ZrO_4$, with $Al_2O_3$, $BaO$, $BeO$, $CaO$, $K_2O$, $Na_2O$, $MgO$, $SiO_2$, $SrO$, and $ZrO_4$ being particularly preferred. Preferred compound oxides include murite ($3Al_2O_3.2SiO_2$), forsterite ($2MgO.SiO_2$), and cordierite ($2MgO.2al_2O_3.5SiO_2$).

These inorganic particles are used with their particle size adjusted to 0.1 to 20 μm, preferably 0.2 to 15 μm, through control of production conditions or by grinding.

The particles are usually used in an amount of 1 to 80 g/m$^2$, preferably 2 to 40 g/m$^2$.

The protective layer is formed by using the above-described electrically insulating particles having substantially no electric conductivity and a binder. The same binder as used in preparation of an electrode active material mixture as hereinafter described can be used in the protective layer. The nonconductive particles are used preferably in an amount of 40 to 96% by weight, particularly 50 to 92% by weight, based on the total weight of the particles and the binder.

The protective layer can be provided on either the positive electrode or the negative electrode or on both the positive and negative electrodes. Where the positive electrode or negative electrode is formed by applying an active material mixture on both sides of a current collector, the protective layer may be provided on one or both sides of the electrode. However, the protective layer should be provided on at least one of the side of the positive electrode and the side of the negative electrode that are facing each other with a separator therebetween.

The protective layer can be formed by a successive coating method in which an active material mixture containing a material capable of reversibly intercalating and deintercalating lithium is applied to a current collector and a protective layer is applied thereon subsequently, or a simultaneous coating method in which an active material mixture layer and a protective layer are formed simultaneously.

Other materials and a method for producing the nonaqueous secondary battery of the present invention will be described below in detail.

The positive or negative electrode for use in the nonaqueous secondary battery of the present invention can be made by applying a positive electrode material mixture or a negative electrode material mixture on a current collector. The positive or negative electrode material mixture may contain an electric conducting agent, a binder, a dispersant, a filler, an ion conducting agent, a pressure increasing agent and other various additives in addition to the respective active material.

The surface of the oxide as a positive electrode active material or the negative electrode material can be coated with an oxide having a different chemical formula from the positive electrode active material or the negative electrode material. The oxide of surface is preferably one containing a compound soluble under both the acidic condition and the alkaline condition. A metal oxide having high electron conductivity is still preferred. Examples of the metal oxide includes $PbO_2$, $Fe_2O_3$, $SnO_2$, $In_2O_3$, and ZnO. It is also preferable to incorporate a dopant (e.g., a metal having different valénce from a metal of the oxide, a halogen atom, etc.) into these oxides. $SiO_2$, $SnO_2$, $Fe_2O_3$, ZnO, and $PbO_2$ are particularly preferred as the oxides for surface treatment. The amount of the metal oxide to be used for the surface treatment is preferably 0.1 to 10% by weight, still preferably 0.2 to 5% by weight, particularly preferably 0.3 to 3% by weight, based on the positive electrode active material or the negative electrode material.

The surface of the positive electrode active material or the negative electrode material may be modified by treating the surface of metal oxide with, for example, an esterifying agent, a chelating agent, a conducting high polymer or polyethylene oxide.

Examples of the other negative electrode materials which can be used in combination include metallic lithium, a lithium alloy (e.g., with Al, Al—Mn (see U.S. Pat. No. 4,820,599), Al—Mg (see JP-A-57-98977), Al—Sn (see JP-A-63-6742), Al—In, Al—Cd (see JP-A-1-144573)), and a calcined carbonaceous compound capable of intercalating and deintercalating lithium ions or metallic lithium (see JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, and JP-A-1-274360).

The purpose of the combined use of metallic lithium or a lithium alloy is not to utilize the dissolution-precipitation reaction of metallic lithium, etc. as an electrode reaction but to intercalate lithium into the negative electrode material used in the present invention within a battery.

An electrode material mixture can contain an electric conducting agent, a binder, a filler, and so forth.

The electric conducting agent may be any electron-conducting material which undergoes no chemical change in an assembled battery. Suitable examples of conducting agents include natural graphite (scale graphite, flake graphite, lumpy graphite, etc.), artificial graphite, carbon black, acetylene black, Ketjen black, carbon fiber, metal powder (e.g., copper, nickel, aluminum or silver (see JP-A-63-148554)), metallic fiber or polyphenylene derivatives (see JP-A-59-20971), and mixtures of two or more thereof. A combination of graphite and acetylene black is particularly preferred. The mixture of graphite/acetylene black is preferably used in an amount of 1 to 50% by weight, particularly 2 to 30% by weight. The mixture of carbon and graphite is preferably used in an amount of 2 to 15% by weight.

Examples of the binder includes polysaccharides, thermoplastic resins, and polymers with rubber elasticity such as starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene terpolymers (EPDM), sulfonated EPDM, styrene-butadiene rubbers, polybutadiene, fluorine rubbers, polyethylene oxide, and mixtures of two or more thereof. In using a compound having a functional group reactive with lithium, such as a polysaccharide, it is preferable to inactivate the functional group by addition of such a compound having an isocyanate group. The binder is preferably used in an amount of 1 to 50% by weight, particularly preferably 2 to 30% by weight.

The filler to be used is not particularly limited as long as it is a fibrous material undergoing no chemical change in an assembled battery. Fibers of polyolefins (e.g., polypropylene or polyethylene), glass or carbon are usually used. While not limiting, the filler is preferably used in an amount of from 0 to 30% by weight.

In using the negative electrode material according to the present invention in a nonaqueous secondary battery, it is preferable that a water dispersion past of an electrode material mixture containing the compound of the present invention is applied to a current collector and dried an that the water-dispersion paste has a pH of 5 or more to less than 10, particularly 6 or more to less than 9. It is preferable that the water-dispersion paste be kept at a temperature at 5° C. or more to lower than 80° C. and that the paste be applied to a current collector within 7 days from the preparation.

It is known that the following compounds can be added to the electrolyte for the purpose of improving charge and discharge characteristics. Examples of such the compounds include pyridine (see JP-A-49-108525), triethyl phosphite (see JP-A-47-4376), thriethanolamine (see JP-A-52-72425), a cyclic ether (see JP-A-57-152684), ethylenediamine (see JP-A-58-87777), n-glyme (see JP-A-58-87778), hexaphosphoric triamide (see JP-A-58-87779), a nitrobenzene derivative (see JP-A-58-214281), sulfur (see JP-A-59-8280), a quinoneimine dye (see JP-A-59-68184), an N-substituted oxazolidinone and an N,N'-substituted imidazolidinone (see JP-A-59-154778), an ethylene glycol dialkyl ether (see JP-A-59-205167), a quaternary ammonium salt (see JP-A-60-30065), polyethylene glycol (see JP-A-60-41773), pyrrole (see JP-A-60-79677), 2-methoxyethanol (see JP-A-60-89075), $AlCl_3$ (see JP-A-61-88466), a monomer providing an electrically conductive polymer as an electrode active material (see JP-A-61-161673), triethylenephosphoramide (see JP-A-61-208758), a trialkylphosphine (see JP-A-62-80976), morpholine (see JP-A-62-80977), an aryl compound having a carbonyl group (see JP-A-62-86673), hexamethylphosphoric triamide and a 4-alkylmorpholine (see JP-A-62-217575), a bicyclic tertiary amine (see JP-A-62-2175578), an oil (see JP-A-62-287580), a quaternary phosphonium salt (see JP-A-63-121268), and a tertiary sulfonium salt (see JP-A-63-121269).

In order to impart incombustibility the electrolytic solution, a halogen-containing solvent, such as carbon tetrachloride or trifluorochloroethylene, may ba added to the electrolytic solution (see JP-A-48-36632).

In order to impart suitability to high-temperature storage, carbonic acid gas may be incorporated to the electrolytic solution (see JP-A-59-134567). Further, the positive or negative electrode material mixture may contain an electrolytic solution or an electrolyte. For example, it is known to add the above-mentioned ion-conductive polymer or nitromethane (see JP-A-48-36633) or an electrolytic solution (see JP-A-57-124870) to the electrode material mixture.

A current collector for the positive or negative electrode may be made of any electron-conducting substance which undergoes no chemical change in an assembled battery. Examples of suitable materials of a current collector for the positive electrode include stainless steel, nickel, aluminum, titanium, carbon; and aluminum or stainless steel surface-treated with carbon, nickel, titanium or silver. Aluminum or an aluminum alloy is particularly preferred. Examples of suitable materials of a current collector for the negative electrode include stainless steel, nickel, copper, titanium, aluminum, carbon; copper or stainless steel surface-treated with carbon, nickel, titanium or silver; and an Al—Cd alloy. Copper or a copper alloy is particularly preferred. These materials may be subjected to surface-oxidation. It is desirable to provide unevenness on the surface of the current collector by surface treatment. The current collector may have a variety of forms, such as a film, a foil, a sheet, a net, a punched sheet, a lath, a porous body, a foamed body, a fibrous body, and so on. While not limiting, the thickness of the current collector is from 1 to 500 $\mu$m.

The battery may have any form, such as a coin, a button, a sheet, a cylinder, a flat shape, an angular shape, and the like. In a coin or button battery, the positive electrode active material mixture or negative electrode material mixture is compressed into a pellet. The thickness and diameter of the pellet are decided according to the battery size. For use in a sheet, angular or cylindrical battery, the positive electrode active material mixture or negative electrode material mixture is usually applied to a current collector, dried, and compressed. General coating techniques, such as reverse roll coating, direct roll coating, blade coating, knife coating, extrusion coating, curtain coating, gravure coating, bar coating, dip coating and squeeze coating, can be used.

Blade coating, knife coating and extrusion coating methods are preferred of them. Coating is preferably carried out at a speed of 0.1 to 100 m/min.

Proper selection of a coating method in agreement with the physical properties and drying properties of the electrode material mixture solution will provide satisfactory surface conditions of the resulting coated layer. Coating on both sides of the current collector may be carried out either one by one or simultaneously.

The electrode material mixture can be applied continuously or at intervals or in stripes. The thickness, length and width of the coated layer depend on the battery size. A preferred coated thickness after drying and compression is 1 to 2000 $\mu$m per side.

Drying or dehydration of the pellet or the sheet is conducted by a general means, preferably hot air, vacuum, infrared rays, far infrared rays, electron beams, and low humidity air, either alone or in combination thereof. The drying temperature preferably ranges from 80° to 350° C., particularly from 100° to 250° C. It is preferable for cycle characteristics that the total water content in the battery be not more than 2000 ppm, with the water content of each of the positive and negative electrode material mixtures and the electrolyte being not more than 500 ppm. Compression of the pellet or sheet may be carried out by a generally employed means, preferably by a mold press method or calender press method. While not limiting, the pressing pressure is preferably 0.2 to 3 t/cm$^2$. The pressing speed in calendering press is preferably 0.1 to 50 m/min. The pressing temperature is preferably from room temperature to 200°C. The ratio of the width of the negative electrode sheet to that if the positive electrode sheet is preferably 0.9 to 1.1, particularly 0.95 to 1.0. The ratio of the content of the positive electrode active material to that of the negative electrode material cannot be specified because it depends on the kinds of compounds used and the compounding ratio in the preparation of the electrode material mixture. That ratio can be optimized with the capacity, cycle characteristics, and safety being taken into consideration.

A positive electrode sheet and a negative electrode sheet are superimposed one on another via a separator and inserted into a battery case in a rolled or folded form. The sheets and the case are electrically connected, an electrolytic solution is poured into the case, and the case is sealed with a sealing plate. An explosion-proof valve may be used as a sealing plate. Various known safety elements may be provided in addition to the explosion-proof valve. For example, a fuse, a bimetal, a PTC element, etc. may be used as an element for prevention of over-current. In addition to the safety valve, countermeasures against an increase in inner pressure can be taken, such as making a cut in a battery case, making a crack in a gasket, making a crack in a sealing plate, or providing a mechanism of breaking from a lead plate. A protective circuit having a countermeasure against an overcharge or an overdischarge may be incorporated into a charger integrally or connected to a charger as an independent circuit.

As a countermeasure against an overcharge, the battery may be provided with a system of breaking the current with an increase of the inner pressure. In this case, a compound which increases the inner pressure can be incorporated into the electrode material mixture or the electrolyte. Examples of the compound used for increasing the inner pressure include carbonates, such as $Li_2CO_3$, $LiHCO_3$, $Na_2CO_3$, $NaHCO_3$, $CaCO_3$, and $MgCO_3$.

A battery case and a lead plate are made of an electrically conductive metal or alloy, such as iron, nickel, titanium, chromium, molybdenum, copper, aluminum, and alloys thereof. The cap, case, sheets and lead plates can be welded by a known technique (e.g., direct current or alternating current electric welding, laser welding or ultrasonic welding).

Conventional compounds or mixtures known as a sealing agent, such as asphalt, can be used as a sealant for the battery.

Application of the nonaqueous secondary battery of the present invention is not particularly limited. For example, it is mounted in electronic equipment, such as color notebook personal computers, monochromatic notebook personal computers, pen touch personal computers, pocket (palm-top) personal computers, notebook word processors, pocket word processors, electronic book players, mobile phones, wireless phone extensions, pagers, handy terminals, portable facsimiles, portable copiers, portable printers, headphone stereos, video cameras, liquid crystal TV sets, handy cleaners, portable CD, mini disk systems, electrical shavers, machine translation systems, land mobile radiotelephones, transceivers, electrical tools, electronic notebooks, pocket calculators, memory cards, tape recorders, radios, backup powers, memory cards, and so on. For livelihood, it is useful in automobiles, electrically-powered vehicles, motors, lights, toys, family (home) computers, load conditioners, irons, watches, stroboscopic lamps, cameras, and medical equipment (e.g., pacemakers, hearing aids, and massaging machines). It is also applicable for military equipment and spacecraft equipment. The nonaqueous secondary battery of the present invention may be used in combination with solar batteries.

Figure 1:
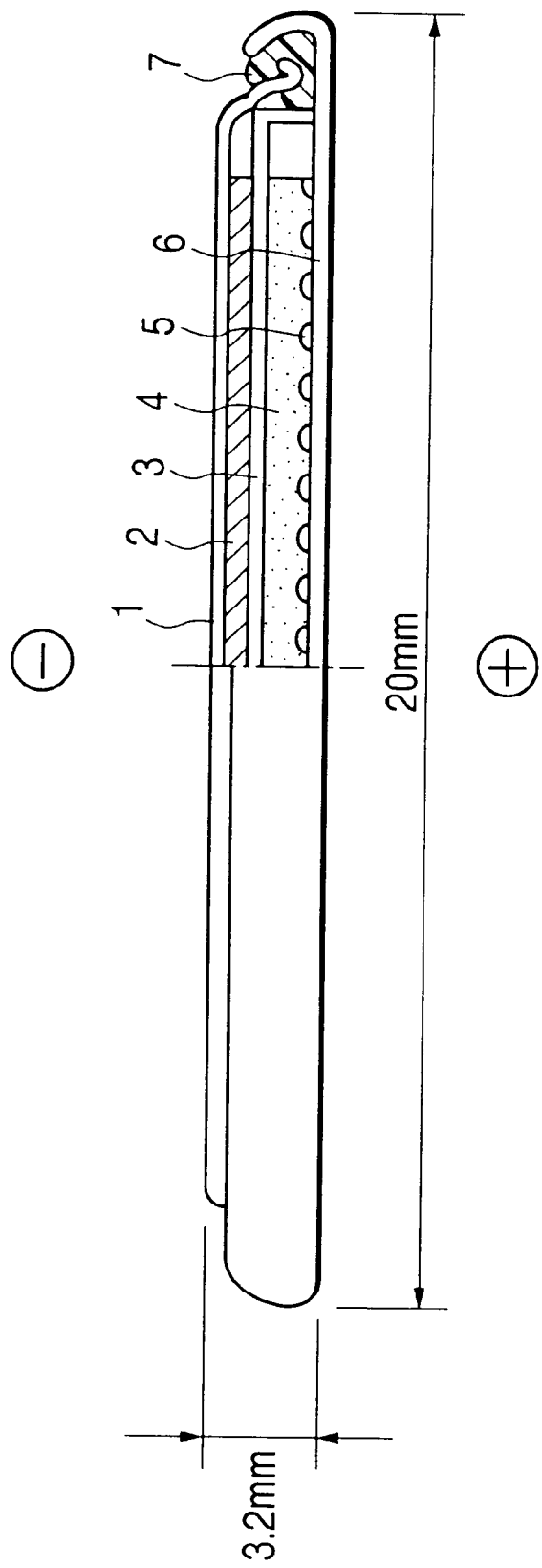
FIG. 1 is a cross section of a coin battery used in Examples.

Reference Numerals in Figures:

1 ... Negative electrode sealing plate
2 ... Negative electrode material mixture pellet
3 ... Separator
4 ... Positive electrode material mixture pellet
5 ... Current collector
6 ... Positive electrode case
7 ... Gasket
8 ... Positive electrode sheet
9 ... Negative electrode sheet
10 ... Separator
11 ... Battery case
12 ... Battery cap
13 ... Gasket
14 ... Explosion-proof valve

BEST MODES FOR CARRYING OUT THE INVENTION

The present invention will be illustrated in greater detail with reference to Examples, but the invention is not limited thereto as long as modifications do not deviate from the conception of the invention.

EXAMPLE 1

Stannous monoxide (13.5 g) and boron phosphate (5.3 g) were dry-blended, put in an alumina-made crucible, heated at a rate of 15° C./min at 1100° C. or less in an argon atmosphere, and then calcined at 1100° C. for 12 hours. The temperature was dropped to room temperature at a rate of 10° C./min, and the calcination product was taken out of the furnace to obtain $SnB_{0.5}P_{0.5}O_3$. The compound was crushed and further ground in a jet mill to obtain powder having an average particle size of 7.0 μm (Compound 1-1). In X-ray diffractometry using CuKα rays, Compound 1-1 exhibited a broad scatter bank having a peak around 28° in terms of the 2θ value. No crystalline diffraction line appeared at the 2θ value of from 40° to 70° C.

The following compounds were synthesized by mixing stoichiometric amounts of raw materials, calcining the mixture, and grinding in the same manner as described above.

(1-2) $SnAl_{0.2}B_{0.4}P_{0.4}P_{2.9}$
(1-3) $SnMg_{0.2}B_{0.4}P_{0.4}O_{2.8}$
(1-4) $SnMg_{0.1}B_{0.45}P_{0.45}F_{0.2}O_{2.8}$
(1-5) $Sn_{1.3}Al_{0.1}Mg_{0.1}B_{0.4}P_{0.4}O_{3.15}$
(1-6) $Sn_{1.5}Al_{0.1}Mg_{0.1}B_{0.4}P_{0.4}F_{0.2}O_{3.25}$
(1-7) $Sn_{0.8}Mn_{0.2}B_{0.5}P_{0.5}O_3$
(1-8) $Sn_{0.7}Fe_{0.3}Al_{0.2}B_{0.4}P_{0.4}O_{2.9}$
(1-9) $Sn_{0.7}Pb_{0.3}Mg_{0.1}B_{0.45}P_{0.45}F_{0.2}O_{2.8}$
(1-10) $Sn_{0.9}Na_{0.2}B_{0.5}P_{0.5}O_3$
(1-11) $Sn_{0.9}Li_{0.2}B_{0.5}P_{0.5}O_3$
(1-12) $Sn_{0.9}Ag_{0.2}B_{0.5}P_{0.5}O_3$
(1-13) $Sn_{0.9}Tl_{0.2}B_{0.5}P_{0.5}O_3$
(1-14) $Sn_{0.8}La_{0.13}B_{0.5}P_{0.5}O_3$
(1-15) $Sn_{0.8}Bi_{0.13}B_{0.5}P_{0.5}O_3$
(1-16) $Sn_{1.0}Cs_{0.1}P_{0.5}B_{0.5}O_{3.05}$
(1-17) $Sn_{1.1}Cs_{0.15}P_{0.5}P_{0.5}O_{3.175}$
(1-18) $Sn_{1.0}Cs_{0.1}Mg_{0.1}P_{0.5}B_{0.5}O_{3.15}$
(1-19) $Sn_{1.1}K_{0.1}Mg_{0.1}P_{0.5}B_{0.5}O_{3.25}$

These compounds similarly exhibited a broad scatter band having a peak at the 2θ value of from 20° to 40° in X-ray diffractometry using Cukα rays.

EXAMPLE 2

Stannous monoxide (13.5 g) and boron phosphate (5.3 g) were dry-blended, put in an alumina-made crucible, heated at a rate of 15° C./min at 1100° C. or less in an argon atmosphere, and then calcined at 1100° C. for 10 hours. The calcination product was flowed out on a stainless steel foil in an argon atmosphere for quenching. The compound was crushed and further ground in a vibration mill to obtain $SnO \cdot B_{0.5}P_{0.5}O_2$ having an average particle size of 6.5 μm (Compound 2-1). Compound 2-1 exhibited a broad scatter band having a peak at the 2θ value of form 20° and 40° in X-ray diffractometry conducted in the same manner as in Example 1.

EXAMPLE 3

Stannous monoxide (13.5 g) and boron phosphate (5.3 g) were weighed out and dry-blended in a ball mill. The mixture was put in an alumina-made crucible, heated at a rate of 10° C./min at 1100° C. or less in an argon atmosphere, and then calcined at 1100° C. for 10 hours. The calcination product was cooled to room temperature at a rate of 8.3° C./min to obtain a glassy compound. The compound was ground in a jet mill followed by air classification to obtain Compound 3-1 having an average particle size of 6 μm.

EXAMPLE 4

Stannous monoxide (13.5 g) and boron phosphate (5.3 g) were dry-blended in a ball mill. The mixture was put in an alumina-made crucible, heated at a rate of 10° C./min at 1110° C. or less in an argon atmosphere, and then calcined at 1100° C. for 10 hours. The calcination product was quenched by pouring into water in an argon atmosphere to obtain a glassy compound. The compound was wet-ground in a ball mill using water as a medium. The resulting powder as dispersed in water was passed through a filter of 25 μm to remove coarse particles. Water was removed by decantation and dried at 150° C. for 1 hour to obtain Compound 4-1 having an average particle size of 7.1 μm. The compound exhibited a broad scatter band having a peak at the 2θ value of from 20° to 40° in X-ray diffractometry.

EXAMPLE 5

A negative electrode was prepared by mixing 82 wt % of Compound 1-1 synthesized in Example 1, 8 wt % of flake graphite and 4 wt % of acetylene black as electric conducting agents, and 6 wt % of polyvinylidene fluoride as a binder, compressing the mixture into a pellet measuring 13 mm in diameter and weighing 22 mg, and drying the pellet at 150° C. for 3 hours by means of a far infrared heater in a dry box (dry air having a dew point of −40 to −70° C.). A positive electrode was prepared by mixing 82 wt % of a positive electrode active material $LiCoO_2$, 8 wt % of flake graphite and 4 wt % of acetylene black as electric conducting agents, and 6 wt % of polytetrafluoroethylene as a binder, compressing the mixture into a pellet measuring 13 mm in diameter (the weight was adjusted in conformity with the lithium intercalation capacity of Compound 1-1; the discharge capacity of $LiCoO_2$ was 170 mAh/g), and drying the pellet at 150° C. for 3 hours by means of a far infrared heater in the same dry box as described above.

A SUS316 net having a thickness of 80 μm was welded as a current collector to each of a positive electrode coin case and a negative electrode coin case. A laminate of a finely porous polypropylene sheet and polypropylene nonwoven fabric as a separator was impregnated with 200 μl of an electrolyte comprising a 2:2:6 (by volume) mixed solvent of ethylene carbonate, butylene carbonate and dimethyl carbonate containing 1 mol/l of $LiPF_6$. A coin type nonaqueous secondary battery shown in FIG. 1 was assembled from these parts in the same dry box as used above.

The resulting nonaqueous secondary battery was tested for charge and discharge performance at a constant current density of 0.75 mA/cm$^2$ and in a voltage range of 4.2 to 2.8 V. All the tests were started with a charge. The results obtained are shown in Table 1.

Symbols used in Table 1 have the following meanings.

(a) . . . Negative electrode material of the present invention.

(b) . . . First discharge capacity (mAh per gram of the negative electrode material).

(c) . . . Average discharge voltage (V)

(d) . . . Charge and discharge cycle characteristics in terms of the number or cycles at which the discharge capacity drops to 60% of the first discharge capacity.

Coin type nonaqueous secondary batteries were assembled by using each of compounds 1-2 to 1-19, 2-1, 3-1, and 4-1 prepared in Examples 1 to 4 and tested in the same manner as described above. The results are shown in Table 1. From these results it is seen that the negative electrode active materials used in the present invention provide high discharge voltage and high capacity nonaqueous secondary battery having excellent charge and discharge cycle characteristics.

TABLE 1

| a | b (mAH/g) | c (V) | d (cycle) | Remark |
|---|---|---|---|---|
| 1-1 | 560 | 3.50 | 550 | Invention |
| 1-2 | 570 | 3.52 | 535 | " |
| 1-3 | 550 | 3.48 | 575 | " |
| 1-4 | 560 | 3.52 | 590 | " |
| 1-5 | 575 | 3.54 | 555 | " |
| 1-6 | 580 | 3.55 | 610 | " |
| 1-7 | 540 | 3.42 | 450 | " |
| 1-8 | 480 | 3.35 | 490 | " |
| 1-9 | 500 | 3.40 | 570 | " |
| 1-10 | 550 | 3.43 | 585 | " |
| 1-11 | 570 | 3.50 | 650 | " |
| 1-12 | 550 | 3.45 | 570 | " |
| 1-13 | 580 | 3.48 | 565 | " |
| 1-14 | 580 | 3.48 | 565 | " |
| 1-15 | 530 | 3.53 | 595 | " |
| 1-16 | 540 | 3.50 | 720 | " |
| 1-17 | 560 | 3.51 | 690 | " |
| 1-18 | 520 | 3.49 | 730 | " |
| 1-19 | 550 | 3.50 | 700 | " |
| 2-1 | 590 | 3.52 | 665 | " |
| 3-1 | 580 | 3.50 | 590 | " |
| 4-1 | 600 | 3.53 | 695 | " |

EXAMPLE 6

The following compounds were synthesized in the same manner as in Example 1. Coin type nonaqueous secondary batteries were assembled in the same manner as in Example 5 and subjected to the same charge and discharge test. The results obtained are shown in Table 2. The results prove that the negative electrode active materials used in the present invention provide high charge voltage and high capacity nonaqueous secondary batteries having excellent charge and discharge cycle characteristics.

(6-1)$SnAl_{0.1}B_{0.4}P_{0.5}O_3$ (6-2)$Sn_{1.3}Al_{0.2}B_{0.4}P_{0.4}O_{3.2}$ (6-3)$Sn_{1.6}Al_{0.1}B_{0.3}P_{0.4}Ca_{0.2}O_{3.4}$ (6-4)$Sn_{1.3}Al_{0.1}B_{0.3}P_{0.4}Ca_{0.2}O_{3.1}$ (6-5)$Sn_{1.6}Al_{0.1}B_{0.3}P_{0.4}Ba_{0.2}O_{3.4}$ (6-6)$Sn_{1.3}Al_{0.1}B_{0.3}P_{0.4}Ba_{0.2}O_{3.1}$ (6-7)$Sn_{1.6}Al_{0.1}B_{0.3}P_{0.4}Mg_{0.2}O_{3.4}$ (6-8)$Sn_{1.6}Al_{0.1}B_{0.3}P_{0.4}K_{0.2}O_{3.3}$ (6-9)$Sn_{1.3}Al_{0.1}B_{0.3}P_{0.4}K_{0.2}O_3$ (6-10)$Sn_{1.0}Al_{0.1}B_{0.3}P_{0.4}K_{0.2}O_{2.7}$ (6-11)$Sn_{1.6}Al_{0.1}B_{0.3}P_{0.4}Na_{0.2}O_{3.3}$ (6-12)$Sn_{1.3}Al_{0.1}B_{0.3}P_{0.4}Na_{0.2}O_3$ (6-13)$Sn_{1.0}Al_{0.1}B_{0.3}P_{0.4}Na_{0.2}O_{2.7}$ (6-14)$Sn_{1.6}Al_{0.1}B_{0.3}P_{0.4}Rb_{0.2}O_{3.3}$ (6-15)$Sn_{1.3}Al_{0.1}B_{0.3}P_{0.4}Rb_{0.2}O_3$ (6-16)$Sn_{1.0}Al_{0.1}B_{0.3}P_{0.4}Rb_{0.2}O_{2.7}$ (6-17)$Sn_{1.6}Al_{0.1}B_{0.3}P_{0.4}Cs_{0.2}O_{3.3}$ (6-18)$Sn_{1.3}Al_{0.1}B_{0.3}P_{0.4}Cs_{0.2}O_3$ (6-19)$Sn_{1.0}Al_{0.1}B_{0.3}P_{0.4}Cs_{0.2}O_{2.7}$ (6-20)$Sn_{1.5}Al_{0.1}B_{0.3}P_{0.4}Ba_{0.1}K_{0.1}O_{3.25}$ (6-21)$Sn_{1.5}Al_{0.1}B_{0.3}P_{0.4}Ba_{0.1}Cs_{0.1}O_{3.25}$ (6-22)$Sn_{1.5}Al_{0.1}B_{0.3}P_{0.4}Ca_{0.1}K_{0.1}O_{3.25}$ (6-23)$Sn_{1.5}Al_{0.1}B_{0.3}P_{0.4}Ca_{0.1}Rb_{0.1}O_{3.25}$ (6-24)$Sn_{1.5}Al_{0.1}B_{0.3}P_{0.4}Y_{0.1}Rb_{0.1}O_{3.3}$ (6-25)$Sn_{1.5}Al_{0.1}B_{0.3}P_{0.4}Ca_{0.1}Rb_{0.1}R_{0.2}O_{3.15}$ (6-26)$Sn_{0.9}Fe_{0.3}B_{0.4}P_{0.4}Ca_{0.1}Rb_{0.1}O_{2.95}$ (6-27)$Sn_{0.9}Mn_{0.1}Mg_{0.1}P_{0.9}O_{3.35}$ (6-28) $Sn_{1.1}Al_{0.1}Cs_{0.1}P_{0.5}B_{0.5}O_{3.25}$
(6-29) $Sn_{1.1}Al_{0.1}Mg_{0.1}K_{0.1}P_{0.5}B_{0.5}O_{3.4}$
(6-30) $Sn_{1.2}Al_{0.2}Cs_{0.1}Mg_{0.1}P_{0.5}B_{0.5}O_{3.65}$

These compounds similarly exhibited a broad scatter bank at the 2θ value of from 20° to 40° in X-ray diffractometry using CuKα rays.

TABLE 2

| a | b (mAH/g) | c (V) | d (cycle) | Remark |
|---|---|---|---|---|
| 6-1 | 480 | 3.50 | 500 | Invention |
| 6-2 | 510 | 3.49 | 480 | " |
| 6-3 | 520 | 3.45 | 530 | " |
| 6-4 | 500 | 3.42 | 550 | " |
| 6-5 | 530 | 3.46 | 500 | " |
| 6-6 | 510 | 3.44 | 520 | " |
| 6-7 | 580 | 3.50 | 550 | " |
| 6-8 | 550 | 3.54 | 715 | " |
| 6-9 | 525 | 3.53 | 730 | " |
| 6-10 | 510 | 3.51 | 750 | " |
| 6-11 | 520 | 3.53 | 650 | " |
| 6-12 | 500 | 3.52 | 665 | " |
| 6-13 | 490 | 3.50 | 690 | " |
| 6-14 | 540 | 3.51 | 720 | " |
| 6-15 | 520 | 3.50 | 750 | " |
| 6-16 | 500 | 3.48 | 780 | " |
| 6-17 | 505 | 3.51 | 760 | " |
| 6-18 | 475 | 3.49 | 800 | " |
| 6-19 | 450 | 3.47 | 830 | " |
| 6-20 | 540 | 3.52 | 750 | " |
| 6-21 | 510 | 3.50 | 730 | " |
| 6-22 | 525 | 3.53 | 780 | " |
| 6-23 | 530 | 3.51 | 750 | Invention |
| 6-24 | 525 | 3.51 | 780 | " |
| 6-25 | 520 | 3.50 | 775 | " |
| 6-26 | 480 | 3.45 | 510 | " |
| 6-27 | 450 | 3.50 | 480 | " |
| 6-28 | 540 | 3.51 | 750 | " |
| 6-29 | 530 | 3.50 | 770 | " |
| 6-30 | 580 | 3.52 | 730 | " |

As is apparent from the above results, the negative electrode active materials used in the present invention provide nonaqueous secondary batteries exhibiting excellent charge and discharge cycle characteristics, a high discharge voltage, and a high capacity. Among the negative electrode materials of the present invention, composite oxides containing the group 1 or 2 element of the Periodic Table, particularly those containing the group 1 element, especially K or Cs, prove excellent in cycle performance.

EXAMPLE 7

The following compounds were synthesized in the same manner as in Example 1. Coin type nonaqueous secondary batteries were assembled in the same manner as in Example 5 and subjected to the same charge and discharge test. The results obtained are shown in Table 3. It is seen from the results that the negative electrode active materials used in the present invention provide high charge voltage and high capacity nonaqueous secondary batteries having excellent charge and discharge cycle characteristics.

Compounds 7-2 to 7-32, 7-34, and 7-35 were prepared at a calcination temperature of 1000° C., and compound 7-33 was prepared at a calcination temperature of 1100° C.

(7-1) $SnGe_{0.1}P_{0.5}B_{0.5}K_{0.1}Mg_{0.1}O_{3.35}$
(7-2) $SnGe_{0.1}P_{0.5}B_{0.5}Al_{0.1}K_{0.1}O_{3.4}$
(7-3) $SnGe_{0.1}O_{0.5}B_{0.5}Ba_{0.05}K_{0.1}O_{3.3}$
(7-4) $SnGe_{0.1}P_{0.5}B_{0.5}Pb_{0.05}K_{0.1}O_{3.35}$
(7-5) $SnGe_{0.1}P_{0.5}B_{0.5}Cs_{0.1}O_{3.25}$
(7-6) $SnGe_{0.1}P_{0.5}B_{0.5}Mg_{0.01}O_{3.21}$
(7-7) $SnGe_{0.1}O_{0.5}B_{0.5}Mg_{0.1}Li_{0.1}O_{3.35}$
(7-8) $SnGe_{0.1}P_{0.5}B_{0.5}Na_{0.1}O_{3.35}$
(7-9) $SnGe_{0.1}P_{0.5}B_{0.5}Rb_{0.1}O_{3.25}$
(7-10) $SnGe_{0.1}P_{0.5}B_{0.5}Ca_{0.05}K_{0.1}O_{3.3}$
(7-11) $SnGe_{0.1}P_{0.5}B_{0.5}Mg_{0.1}K_{0.1}F_{0.1}O_{3.15}$
(7-12) $SnGe_{0.1}P_{0.5}B_{0.5}Sc_{0.02}K_{0.1}O_{3.28}$
(7-13) $SnGe_{0.1}P_{0.5}B_{0.5}Y_{0.01}K_{0.1}O_{3.265}$
(7-14) $SnGe_{0.1}P_{0.5}B_{0.5}Mg_{0.1}K_{0.1}Al_{0.05}O_{3.475}$
(7-15) $SnGe_{0.2}P_{0.1}B_{0.1}Mg_{0.5}K_{0.5}O_{2.55}$
(7-16) $SnGe_{0.1}P_{0.1}B_{0.1}K_{0.5}O_{1.85}$
(7-17) $SnGe_{0.1}P_{0.35}B_{0.35}Mg_{0.2}K_{0.1}O_{2.85}$
(7-18) $SnGe_{0.1}P_{0.6}B_{0.3}Mg_{0.1}K_{0.1}O_{3.3}$
(7-19) $SnGe_{0.1}P_{0.45}B_{0.45}Mg_{0.1}K_{0.1}O_{3.05}$
(7-20) $SnGe_{0.2}P_{0.45}B_{0.45}Mg_{0.1}K_{0.1}O_{3.35}$
(7-21) $SnGe_{0.01}P_{0.45}B_{0.45}Mg_{0.1}K_{0.1}O_{2.97}$
(7-22) $SnGe_{0.001}P_{0.45}B_{0.45}Mg_{0.1}K_{0.1}O_{2.952}$
(7-23) $SnGe_{0.05}P_{0.45}B_{0.45}Mg_{0.1}K_{0.1}O_{3.05}$
(7-24) $SnGe_{0.02}P_{0.45}B_{0.45}Mg_{0.1}K_{0.1}O_{3.09}$
(7-25) $SnGe_{0.1}P_{0.4}As_{0.1}B_{0.1}K_{0.1}Mg_{0.1}O_{2.75}$
(7-26) $SnGe_{0.1}P_{0.4}B_{0.6}Mg_{0.1}K_{0.1}O_{3.25}$
(7-27) $SnGe_{0.1}P_{0.4}B_{0.6}Cs_{0.1}O_{3.15}$
(7-28) $SnGe_{0.1}P_{1.0}Mg_{0.2}K_{0.1}O_{3.95}$
(7-29) $SnGe_{0.1}P_{0.6}B_{0.6}K_{0.1}Mg_{0.01}O_{3.66}$
(7-30) $SnGe_{0.5}P_{0.7}B_{0.8}K_{0.2}Mg_{0.2}O_{5.25}$
(7-31) $SnGe_{0.8}P_{0.9}B_{0.9}K_{0.1}Mg_{0.1}O_{6.65}$
(7-32) $SnGe_{1.0}P_{1.0}B_{1.0}Cs_{0.1}O_{7.05}$
(7-33) $SnGe_{1.3}P_{1.0}B_{1.0}K_{0.2}O_{8.7}$
(7-34) $SnGe_{0.07}P_{0.5}B_{0.5}Cs_{0.1}O_{3.19}$
(7-35) $SnGe_{0.07}P_{0.5}B_{0.5}K_{0.1}Mg_{0.1}O_{3.29}$

These compounds exhibited a broad scatter band at the 2θ value of from 20° to 40° in X-ray diffractometry using CuKα rays.

TABLE 3

| a | b (mAH/g) | c (V) | d (cycle) | Remark |
|---|---|---|---|---|
| 7-1 | 570 | 3.50 | 630 | Invention |
| 7-2 | 530 | 3.49 | 520 | " |
| 7-3 | 530 | 3.48 | 510 | " |
| 7-4 | 520 | 3.52 | 510 | " |
| 7-5 | 575 | 3.54 | 610 | " |
| 7-6 | 580 | 3.55 | 550 | " |
| 7-7 | 590 | 3.52 | 450 | " |
| 7-8 | 540 | 3.41 | 490 | " |
| 7-9 | 520 | 3.50 | 600 | " |
| 7-10 | 510 | 3.40 | 570 | " |
| 7-11 | 560 | 3.48 | 630 | " |
| 7-12 | 560 | 3.43 | 520 | " |
| 7-13 | 530 | 3.51 | 590 | " |
| 7-14 | 550 | 3.50 | 680 | " |
| 7-15 | 510 | 3.48 | 470 | " |
| 7-16 | 510 | 3.50 | 450 | " |
| 7-17 | 530 | 3.53 | 480 | " |
| 7-18 | 590 | 3.52 | 670 | " |
| 7-19 | 580 | 3.55 | 610 | " |
| 7-20 | 550 | 3.53 | 610 | " |
| 7-21 | 55o | 3.48 | 470 | " |
| 7-22 | 540 | 3.45 | 420 | " |
| 7-23 | 540 | 3.50 | 580 | Invention |
| 7-24 | 570 | 3.51 | 550 | " |
| 7-25 | 530 | 3.48 | 480 | " |
| 7-26 | 520 | 3.50 | 580 | " |
| 7-27 | 550 | 3.52 | 640 | " |
| 7-28 | 580 | 3.55 | 470 | " |
| 7-29 | 510 | 3.50 | 720 | " |
| 7-30 | 580 | 3.51 | 640 | " |
| 7-31 | 610 | 3.55 | 440 | " |
| 7-32 | 620 | 3.50 | 450 | " |
| 7-33 | 590 | 3.52 | 410 | " |
| 7-34 | 530 | 3.50 | 620 | " |
| 7-35 | 540 | 3.51 | 610 | " |

COMPARATIVE EXAMPLE 1

Coin type nonaqueous secondary batteries were produced in the same manner as in Example 1 except for replacing negative electrode material 1-1 with each of reagents SnO, MnO, FeO and SiO, and SnMn$_{0.5}$O$_{1.5}$ (Comparative Compound A), SnFe$_{0.5}$O$_{1.5}$ (Comparative Compound B), SnTa$_{0.5}$O$_{2.25}$ (Comparative Compound C), SnSi$_{0.5}$O$_{1.5}$ (Comparative Compound D), SnB$_{0.5}$O$_{1.75}$ (Comparative Compound E), and SnMg$_{0.3}$O$_{1.3}$ (Comparative Compound F) which were synthesized by the method described below. All compounds A to D exhibited no broad scatter band showing amorphousness in X-ray diffractometry using CuKα rays. A charge and discharge test was carried out for the batteries. Of the comparative compounds, the composite oxides were synthesized as follows.

Stannous oxide (13.5 g) and manganese dioxide (3.6 g) were dry-blended in a ball mill. The mixture was put in an alumina-made crucible, heated at a rate of 15° C./min at 700° C. or less in a vacuum atmosphere, and then calcined at 700° C. for 10 hours. The temperature was dropped to room temperature at a rate of 10° C./min. The calcination product was taken out of the furnace and ground in a jet mill to obtain powder (Comparative Compound A) having an average particle size of 5.0 μm. Comparative Compounds B to D were synthesized in the same manner as described above.

The results of the charge and discharge tests on the batteries are shown in Table 4. It is seen from the results that the compounds of the present invention are superior to any of the comparative compounds in terms of charge and discharge cycle characteristics and capacity.

TABLE 4

| a | b (mAH/g) | c (V) | d (cycle) | Remark |
|---|---|---|---|---|
| SnO | 550 | 3.52 | 55 | Comparison |
| MnO | 360 | 3.20 | 35 | " |
| FeO | 190 | 3.05 | 70 | " |
| SiO | 750 | 3.58 | 70 | " |
| Compara. Compound A | 490 | 3.44 | 30 | " |
| Compara. Compound B | 350 | 3.35 | 80 | " |
| Compara. Compound C | 280 | 3.40 | 120 | " |
| Compara. Compound D | 550 | 3.50 | 15 | " |
| Compara. Compound E | 420 | 3.50 | 80 | " |
| Compara. Compound F | 370 | 3.51 | 50 | " |

EXAMPLE 8

A mixture of 88 wt % of Compound 1-1 synthesized in Example 1 as a negative electrode material, 6 wt % of flake graphite, 4 wt % of an aqueous dispersion of polyvinylidene fluoride and 1 wt % of carboxymethyl cellulose as binders, and 1 wt % of lithium acetate was kneaded in a water as a medium to prepare a slurry. The slurry was applied to both sides of a 18 μm thick copper foil by an extrusion coating method, dried, compressed with calendering, and cut to prescribed width and length to prepare a negative electrode sheet in a band form. The negative electrode sheet measured 78 μm in thickness. A mixture of 87 wt % of LiCoO$_2$ as a positive electrode material, 6 wt % of flake graphite, 3 wt % of acetylene black, and 3 wt % of an aqueous dispersion of polytetrafluoroethylene and 1 wt % of sodium polyacrylate as binders was kneaded with water as a medium to prepare a slurry. The slurry was applied to both sides of a 20 μm thick aluminum foil, dried, pressed, and cut to size in the same manner as described above to obtain a 250 μm thick positive electrode sheet in a band form.

A nickel lead plate and an aluminum lead plate were spot welded to the end of the negative electrode sheet and the end of the positive electrode sheet, respectively. The electrode sheets were dehydrated and dried at 230° C. for 30 minutes in dry air having a dew point of −40° C. or lower. The dried and dehydrated positive electrode sheet (8), a finely porous polyethylene film separator, the dried and dehydrated negative electrode sheet (9), and a separator (10) were laminated in this order and rolled up by a winder.

Figure 2:
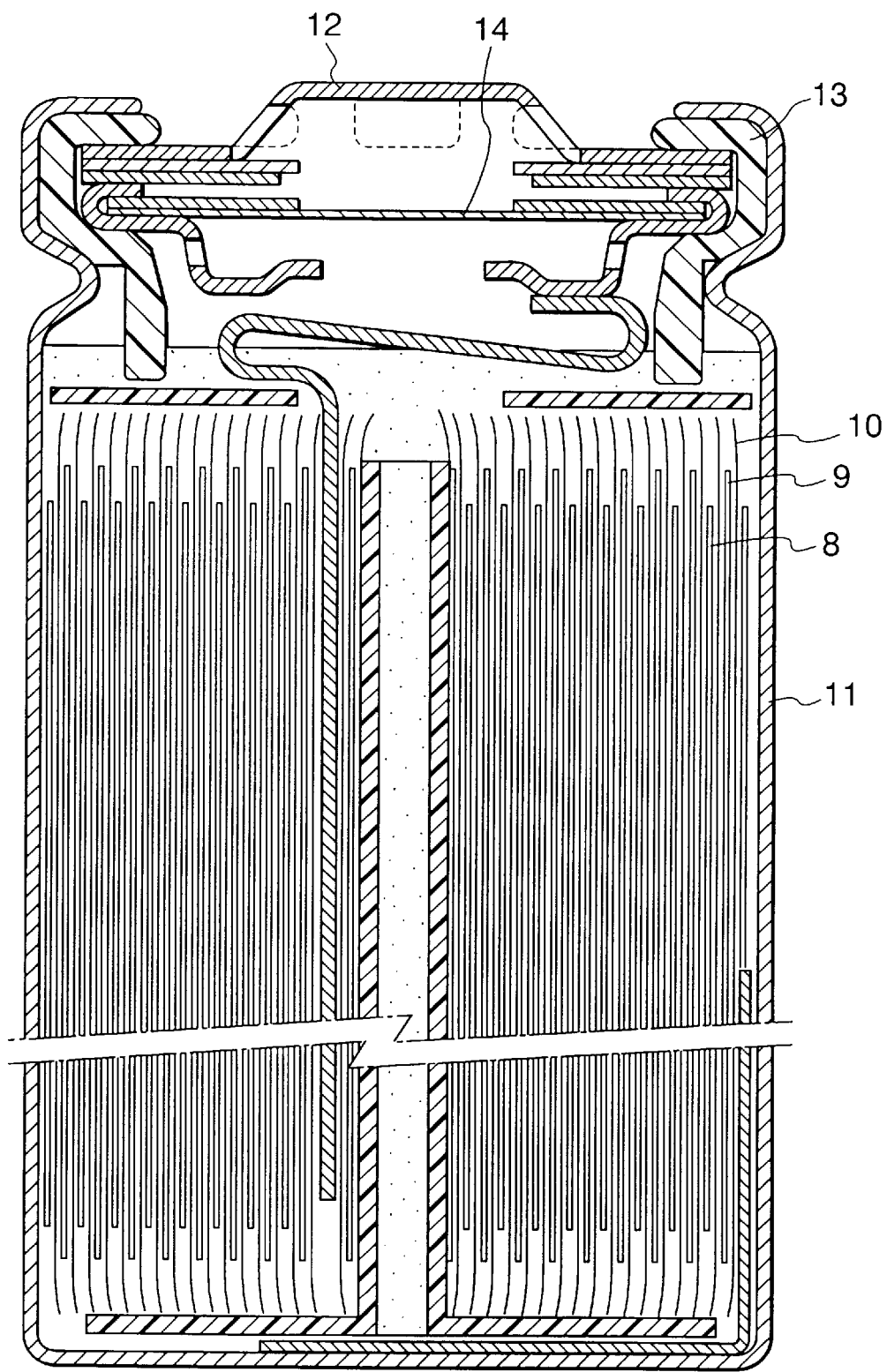
FIG. 2 is a cross section of a cylindrical battery used Examples.

The roll was put in a sealed-end cylindrical battery case (11) made of nickel-plated iron which doubled as a negative electrode terminal. The same electrolyte as used in Example 5 was injected into the battery case. The open top of the case was sealed with a cap (12) having a positive electrode terminal via a gasket (13) to prepare a cylindrical battery. The positive electrode terminal (12) had been connected to the positive electrode sheet (8) through the lead terminal, and the battery case (11) to the negative electrode sheet (9), respectively. The cross section of the cylindrical battery is shown in FIG. 2. Numeral (14) is an explosion-proof valve. Charging and discharging conditions were 4.15 to 2.8 V and 1 mA/cm$^2$. The results are shown in Table 5. The symbols (a), (b), (c) and (d) used in Table 5 are the same as in Example 1. Symbol (e) indicates an energy density per battery.

The results of test evaluations for Compounds 1-2 to 1-20, 6-8, 6-9, 6-10, 6-12, 6-18, 6-27, 6-28, 6-29, 6-30, 7-2, 7-3, 7-5, 7-9, 7-11, 7-14, 7-17, 7-19, 7-21, 7-22, 7-23, 7-24, 7-26, 7-27, 7-30, 7-33, 7-34, and 7-35 are also shown in Table 5.

TABLE 5

| a | b (mAH/g) | c (V) | d (cycle) | e (WH) | Remark |
|---|---|---|---|---|---|
| 1-1 | 537 | 3.55 | 660 | 5.2 | Invention |
| 1-4 | 532 | 3.57 | 640 | 5.2 | " |
| 1-10 | 520 | 3.48 | 680 | 5.0 | " |
| 1-11 | 540 | 3.55 | 760 | 5.1 | " |
| 1-13 | 551 | 3.53 | 670 | 5.1 | " |
| 1-14 | 518 | 3.51 | 680 | 5.0 | " |
| 1-16 | 520 | 3.52 | 700 | 5.2 | " |
| 1-17 | 530 | 3.52 | 680 | 5.3 | " |
| 1-18 | 520 | 3.52 | 720 | 5.2 | " |
| 1-19 | 550 | 3.50 | 700 | 5.2 | " |
| 6-8 | 550 | 3.49 | 640 | 5.1 | " |
| 6-9 | 530 | 3.50 | 630 | 5.3 | " |
| 6-10 | 510 | 3.51 | 680 | 5.2 | " |
| 6-12 | 530 | 3.52 | 690 | 5.2 | " |
| 6-18 | 550 | 3.51 | 680 | 5.3 | " |
| 6-27 | 540 | 3.51 | 580 | 5.2 | " |
| 6-28 | 520 | 3.51 | 730 | 5.1 | " |
| 6-29 | 530 | 3.50 | 700 | 5.2 | " |
| 6-30 | 550 | 3.51 | 680 | 5.3 | " |
| 7-1 | 560 | 3.51 | 780 | 5.4 | " |
| 7-2 | 530 | 3.50 | 690 | 5.2 | " |
| 7-3 | 530 | 3.52 | 685 | 5.2 | " |
| 7-5 | 560 | 3.52 | 760 | 5.3 | Invention |
| 7-9 | 520 | 3.50 | 750 | 5.1 | " |
| 7-11 | 560 | 3.50 | 750 | 5.4 | " |
| 7-14 | 550 | 3.50 | 750 | 5.3 | " |
| 7-17 | 540 | 3.55 | 650 | 5.3 | " |
| 7-19 | 580 | 3.55 | 720 | 5.4 | " |
| 7-21 | 550 | 3.50 | 650 | 5.2 | " |
| 7-22 | 550 | 3.49 | 650 | 5.2 | " |
| 7-23 | 550 | 3.50 | 730 | 5.3 | " |
| 7-24 | 580 | 3.52 | 680 | 5.4 | " |
| 7-26 | 530 | 3.52 | 690 | 5.2 | " |
| 7-27 | 560 | 3.53 | 750 | 5.3 | " |
| 7-30 | 580 | 3.52 | 780 | 5.2 | " |
| 7-33 | 590 | 3.53 | 550 | 5.6 | " |

TABLE 5-continued

| a | b (mAH/g) | c (V) | d (cycle) | e (WH) | Remark |
|---|---|---|---|---|---|
| 7-34 | 570 | 3.50 | 750 | 5.5 | " |
| 7-35 | 570 | 3.55 | 780 | 5.4 | " |

COMPARATIVE EXAMPLE 2

Cylindrical batteries were assembled in the same manner as in Example 8 except for replacing Compound 1-1 as a negative electrode active material with SnO or $SnSi_{0.5}O_{1.5}$. The results of a charge and discharge test on these batteries are shown in Table 6 below.

TABLE 6

| a | b (mAH/g) | c (V) | d (cycle) | e (WH) | Remark |
|---|---|---|---|---|---|
| SnO | 520 | 3.57 | 65 | 5.4 | Comparison |
| Compara. Compound D | 530 | 3.55 | 10 | 5.5 | " |

EXAMPLE 9

SnO (80.8 g), $Al_2O_3$ (5.1 g), $B_2O_3$ (13.9 g), $Sn_2P_2O_7$ (80.27 g), and $Cs_2CO_3$ (16.29 g) were dry-blended. The mixture was put in an alumina-made crucible, heated at a rate of 15° C./min at 1000° C. or less in an argon atmosphere, and calcined at 1000° C. for 12 hours. The melt was quenched by pouring into water in an argon atmosphere to obtain a glassy compound. The compound was wet ground in a ball mill together with water as a medium for 24 hours to obtain a sample having an average particle size of 9.7 μm (Compound 9-1A). The compound exhibited a broad scatter band having a peak at the 2θ value of about 28° in X-ray diffractometry. No diffraction line attributed to a crystal structure was observed at the 2θ value of from 40° to 70°.

Measurement of Content (by Weight) of Particles with a Particle Size of 25 μm or more:

One kilogram of Compound 9-1A in 10 l of water was passed through a sieve of 25 μm while stirring. The sieve was dried at 150° C. for 2 hours. The residue on the sieve weighted 5.0 g (content (by weight) of particles having a particle size of 75 μm or more: 0.50 wt %).

Measurement of Content (by Weight) of Particles with a Particle Size of 1 μm or Less:

The particle size distribution of Compound 9-1A was determined with a particle size measuring device ("LA-500", manufactured by HORIBA). The cumulative volume frequency of particles of 1 μm or less was taken as a content (by weight) of the particles.

A glassy compound was obtained in the same manner as in Compound 9-1A. The compound was then ground in the same manner as in Compound 9-1A, except for increasing the rate of feeding the compound to the jet mill by 10%, to obtain Compound 9-1B having an average particle size of 9.3 μm.

A glassy compound was obtained in the same manner as in Compound 9-1A. The compound was then ground in the same manner as in Compound 9-1A, except for increasing the rate of feeding the compound to the jet mill by 25%, to obtain Compound 9-1C having an average particle size of 10.5 μm.

Powder was obtained in the same manner as in Compound 9-1A. The powder was subjected to air classification to obtain Compound 9-1D having an average particle size of 8.7 μm.

A compound was synthesized in the same manner as in Compound 9-1A. After crushing, the coarse particles were ground in a vibration mill ("TI-100", manufactured by HEIKO) for 5 minutes (Comparative Compound 9-1E).

A compound was synthesized in the same manner as in Compound 9-1A. After crushing, the coarse particles were ground in a vibration mill ("TI-100", manufactured by HEIKO) for 20 minutes (Comparative Compound 9-1F).

Cylindrical batteries were assembled in the same manner as in Example 8 except for using each of Compounds 9-1A to 9-1D and Comparative Compounds 9-1E and 9-1F as a negative electrode material. The same charge and discharge test was applied. The results obtained are shown in Table 7.

Further, after the batteries were charged and discharged at 4.15 to 2.8 V, followed by charging to 4.15 V. The charged batteries were stored at 55° C. for 1 month and again discharged to 2.8 V. The ratios of the capacity after storage to that before storage are shown in Table 7.

Furthermore, 50 batteries were assembled for each negative electrode material and taken apart to observe the separator. The number of batteries whose separator suffered scratches in shown in Table 7.

Symbols in Table 7 have the following meanings.

(f) Negative electrode material of the present invention.
(g) Content (wt %) of particles with a particle size of 25 μm or more.
(h) Content (wt %) of particles with a particle size of 1 μm or less.
(i) Discharge capacity per active material (mAH/g).
(j) Average discharge voltage (V).
(k) Charge and discharge cycle characteristics in terms of the number or cycles at which the discharge capacity drops to60% of that obtained at the first cycle.
(l) Ratio of capacity after storage (55° C.×1 month) to that before storage.
(m) The number of batteries showing scratches on the separator.

TABLE 7

| (f) | (g) | (h) | (i) | (j) | (k) | (l) | (m) |
|---|---|---|---|---|---|---|---|
| 9-1A | 1.5 | 3.5 | 530 | 3.50 | 700 | 0.85 | 0 |
| 9-1B | 3.0 | 1.5 | 527 | 3.50 | 680 | 0.80 | 0 |
| 9-1C | 8.0 | 1.3 | 525 | 3.50 | 670 | 0.77 | 0 |
| 9-1D | 8.1 | 0.05 | 540 | 3.50 | 740 | 0.80 | 0 |
| 9-1E | 15.0 | 3.0 | 520 | 3.50 | 680 | 0.45 | 4 |
| 9-1F | 13.2 | 7.2 | 500 | 3.50 | 620 | 0.40 | 3 |

EXAMPLE 10

A cylindrical battery was prepared in the same manner as in Example 8 except for using Compound 7-35 as a negative electrode material and $LiMn_2O_4$ as a positive electrode material. The same charge and discharge test as used in Example 8 was applied to the battery. As a result, excellent battery performance was obtained such that the average discharge voltage was 3.55 V, the cycle characteristics was 630 (cycles), and the energy density per battery was 5.0 WH.

EXAMPLE 11

Cylindrical batteries were prepared in the same manner as in Example 8, except for using Compound 6-1 or Comparative Compound D used in Comparative Example 1 as a negative electrode material and using the following separator. The separators were as follows:

S-1: Polyethylene film having a thickness of 50 μm and a porosity of 63%.

S-2: Ethylene-propylene copolymer film (ethylene content: 50 wt %) having a thickness of 50 μm and a porosity of 62%.

S03: Composite film laminated with a polyethylene film having a thickness of 25 μm and a porosity of 66% and a polypropylene film having a thickness of 25 μm and a porosity of 62%.

S4: Nonwoven fabric having a thickness of 50 μm, composed of polyethylene fibers having an average fiber diameter of 1 μm and an equal weight of polypropylene fibers having an average fiber diameter of 1 μm.

S5: Nonwoven fabric having a thickness of 50 μm, composed of 30 wt % of polyethylene fibers having an average fiber diameter of 1 μm and 70 wt % of polypropylene fibers having an average fiber diameter of 1 μm.

S6: The same as S-2 except that the ethylene content was 20 wt %.

S7: Nonwoven fabric having a thickness of 50 μm, composed of 20 wt % of polyethylene fibers having an average fiber diameter of 1 μm and 80 wt % of polypropylene fibers having an average fiber diameter of 1 μm.

The following separators which were out of the scope of the present invention were prepared.

SC1: Nonwoven fabric having a thickness of 50 μm, composed of 10 wt % of polyethylene fibers having an average fiber diameter of 1 μm and 90 wt % of polypropylene fibers having an average fiber diameter of 1 μm.

SC2: Polypropylene film having a thickness of 50 μm and a porosity of 62%.

SC3: The same as S-2 except that the ethylene content was 10 wt %.

The negative electrode materials and separators used in the sample preparation and sample numbers of the resulting batteries are shown in Table 8.

A charge and discharge test was carried out under conditions of 4.3 to 2.7 V and 1 mA/cm². Further, each sample battery was charged to 4.55 V and shorted externally. The condition of the battery on short-circuiting was examined. The results of these evaluations are shown in Table 8.

Symbols used in Table 8 have the following meanings.
(n) Negative electrode material.
(o) Separator
(p) Discharge capacity (mAg per gram of the negative electrode material) on the fifth cycle.
(q) Charge and discharge cycle characteristics in terms of the number of cycles at which the capacity drops to 85% of that on the first cycle.
(r) Whether the explosion-proof valve opened or not upon external shorting.

TABLE 8

| (n) | (o) | (p) | (q) | (r) |
|---|---|---|---|---|
| 6-1 | S-1 | 465 | 550 | not opened |
| " | S-2 | 470 | 560 | " |
| " | S-3 | 490 | 570 | " |
| " | S-4 | 505 | 565 | " |
| " | S-5 | 495 | 560 | " |
| " | S-6 | 480 | 520 | " |
| " | S-7 | 490 | 530 | " |
| " | SC1 | 495 | 365 | opened |
| " | SC2 | 510 | 480 | " |
| " | SC3 | 500 | 450 | " |

TABLE 8-continued

| (n) | (o) | (p) | (q) | (r) |
|---|---|---|---|---|
| Compara. Compound D | S-1 | 520 | 25 | " |
| Compara. Compound D | S-3 | 530 | 25 | " |
| Compara. Compound D | S-4 | 525 | 30 | " |
| Compara. Compound D | SC1 | 535 | 25 | " |
| Compara. Compound D | SC2 | 540 | 20 | " |

As is apparent from the above results, the safety of the batteries using the negative electrode Compound (6-1) according to the present invention as represented by opening of an explosion-proof valve is dependent on the kind of the separator used. That is, when a separator other than that of the present invention is used, the valve opens in the external short circuit test, and, as a result, the contents of the battery spout. When the separator of the present invention is used, no such abnormality occurs. Of the separators according to the present invention a composite type Separator (S-3) proved to give particularly good results.

Judging from the fact that the kind of separators makes no difference in the external short circuit test where a negative electrode material out of the invention (Comparative Compound D) is used, it is seen that the above-mentioned dependence on the kind of the separator is peculiar to the negative electrode material of the invention. The same dependence was observed with the negative electrode materials other than Compound (6-1).

EXAMPLE 12

A mixture of 88 wt % of Compound 7-1 synthesized in Example 7as a negative electrode material, 6 wt % of flake graphite, 4 wt % of an aqueous dispersion of polyvinylidene fluoride and 1 wt % of carboxymethyl cellulose as binders, and 1 wt % of lithium acetate was kneaded together with water as a medium to prepare a slurry. The slurry was applied to both sides of a 18 μm thick copper foil by an extrusion coating method. A slurry of 94.5 wt % of α-$Al_2O_3$ (average particle size: 1 μm), 4.5% of polyvinylidene fluoride, and 1 wt % of carboxymethyl cellulose in water as a medium was applied to the coated layer to form a protective layer. After drying, the coated layer was compressed by a calendering press machine and cut to prescribed width and length to prepare a negative electrode sheet in a band form. The negative electrode sheet was 100 μm in thickness. A mixture of 87 wt % of $LiCoO_2$ as a positive electrode material, 6 wt % of flake graphite, 3 wt % of acetylene black, and 3 wt % of an aqueous dispersion of polytetrafluoroethylene and 1 w % of sodium polyacrylate as binders was kneaded with water as a medium to prepare a slurry. The slurry was applied to both sides of a 20 μm thick aluminum foil in the same manner as described above. A slurry of 94.5 wt % of α-$Al_2O_3$ (average particle size: 1 μm), 4.5 wt % of polyvinylidene fluoride, and 1 wt % of carboxymethyl cellulose in water as a medium was applied to the coated layer to form a protective layer. After drying, the coated layer was compressed by a calendering press machine and cut to prescribed width and length to obtain a positive electrode sheet in a band form. The positive electrode sheet was 265 μm in thickness. Ten cylindrical batteries were assembled using the resulting negative electrode sheet and positive electrode sheet in the same manner as in Example 8. Each battery was given a charge to 4.15 V and stored at 60° C. for 3 weeks. After 3 weeks, the circuit voltage of each battery was measured to give the following results.

| | |
|---|---|
| 1 | 4.10 V |
| 2 | 4.11 V |
| 3 | 4.11 V |
| 4 | 4.10 V |
| 5 | 4.09 V |
| 6 | 4.10 V |
| 7 | 4.10 V |
| 8 | 4.11 V |
| 9 | 4.10 V |
| 10 | 4.09 V |

COMPARATIVE EXAMPLE 3

Ten cylindrical batteries (G-1 to G-10) were assembled in the same manner as in Comparative Example 2 except for using SnO as a negative electrode material and tested in the same manner as in Example 11.

Ten cylindrical batteries (H-1 to H-10) having a protective layer were assembled in the same manner as in Example 11 except for using SnO as a negative electrode material and tested in the same manner as in Example 11. The results of the test are shown below.

| | | | |
|---|---|---|---|
| G-1 | 1.02 V | H-1 | 4.10 V |
| G-2 | 0.47 V | H-2 | 2.38 V |
| G-3 | 0.72 V | H-3 | 4.12 V |
| G-4 | 0.92 V | H-4 | 4.09 V |
| G-5 | 1.21 V | H-5 | 4.10 V |
| G-6 | 0.02 V | H-6 | 3.22 V |
| G-7 | 0.66 V | H-7 | 4.10 V |
| G-8 | 1.01 V | H-8 | 2.19 V |
| G-9 | 0.55 V | H-9 | 4.11 V |
| G-10 | 0.47 V | H-10 | 4.10 V |

It is clearly seen from the above results that the batteries according to the present invention are obviously prevented from reducing voltage during storage and exhibit stable performance.

EXAMPLE 12

Three hundred batteries were prepared in the same manner as in Example 11. A charge was given to each battery up to 4.15 V. None of the batteries showed an insufficient charge.

COMPARATIVE EXAMPLE 4

Three hundred batteries were prepared in the same manner as in Comparative Example 3 for each of Batteries G and H. The same test as in Example 12 was carried out. As a result, 10 batteries G of 300 batteries and 3 Batteries H of 300 batteries showed an insufficient charge.

From the above results it is clearly seen that the batteries according to the present invention hardly cause a short circuit, having a low percent of defective, and are safe.

INDUSTRIAL APPLICABILITY

A nonaqueous secondary battery which exhibits high safety, a high discharge voltage, a high discharge capacity, and excellent charge and discharge cycle characteristics can be obtained by using a lithium-containing transition metal oxide as a positive electrode active material and at least one specific amorphous composite oxide as a negative electrode material in accordance with the present invention.

We claim:

1. A nonaqueous secondary battery comprising a positive electrode material, a negative electrode material, a nonaqueous electrolyte containing a lithium salt, and a separator, wherein said negative electrode material comprises an amorphous composite oxide represented by formula (6):

$$SnGe_f M^8_g M^4_h O_x \qquad (6)$$

wherein $M^8$ represents at least one of Al, B, or P; $M^4$ represents at least one element from group 1, 2 or 3 of the Periodic Table or a halogen element; f represents a number from 0.001 to 1; g represents a number from 0.2 to 2; h represents a number from 0.01 to 1; and x represents a number from 1.3 to 7.

2. The nonaqueous secondary battery as in claim 1, wherein said negative electrode material comprises an amorphous oxide containing at least one functional element selected from the group consisting of Sn, Mn, Fe, Pb, and Ge and at least one amorphous body-forming element selected from the group consisting of Al, B, P, elements of the groups 1, 2 and 3 of the Periodic Table, and halogen elements.

3. The nonaqueous secondary battery as in claim 2, wherein said negative electrode material comprises an amorphous oxide containing at least one functional element selected from the group consisting of Sn, Mn, Fe, Pb, and Ge and at least one amorphous body-forming element having a standard electrode potential (25° C.) of −3.05 to −2.30 $E^0/V$ in an aqueous solution which is selected from the group consisting of elements of groups 1, 2 and 3 of the Periodic Table and halogen elements.

4. The nonaqueous secondary battery as in claim 2 or 3, wherein said negative electrode material comprises an amorphous oxide containing at least one functional element selected from the group consisting of Sn, Mn, Fe, Pb, and Ge and at least one amorphous body-forming element selected from the group consisting of Mg, Al, B, P, and F.

5. The nonaqueous secondary battery as in claim 4, wherein said negative electrode material comprises an amorphous oxide containing at least one functional element selected from the group consisting of divalent Sn, divalent Mn, trivalent Mn, divalent Fe, divalent Pb, and divalent Ge and at least one amorphous body-forming element selected from the group consisting of Mg, Al, B, P, and F.

6. The nonaqueous secondary battery as in claim 5, wherein said negative electrode material comprises an amorphous oxide containing Sn as a functional element and at least one amorphous body-forming element selected from the group consisting of Mg, Al, B, P, and F.

7. The nonaqueous secondary battery as in claim 2 or 3, wherein said negative electrode material comprises an amorphous oxide containing at least one functional element selected from the group consisting of Sn, Mn, Fe, Pb, and Ge and at least two amorphous body-forming elements selected from the group consisting of Al, B, P, elements of the groups 1, 2 and 3 of the Periodic Table, and halogen elements.

8. The nonaqueous secondary battery as in claim 7, wherein said negative electrode material comprises an amorphous oxide containing at least one functional element selected from the group consisting of divalent Sn, divalent Mn, trivalent Mn, divalent Fe, divalent Pb, and divalent Ge and at least two amorphous body-forming elements selected from the group consisting of Al, B, P, elements of the groups 1, 2 and 3 of the Periodic Table, and halogen elements.

9. The nonaqueous secondary battery as in claim 8, wherein said negative electrode material is an amorphous compound oxide represented by formula (1):

$$Sn_aM^1{}_{1-a}M^2{}_bO_z \qquad (1)$$

wherein $M^1$ represents at least one kind of Mn, Fe, Pb, and Ge; $M^2$ represents at least two kinds of Al, B, P, the elements of groups 1, 2 and 3 of the Periodic Table, and halogen elements; a represents a number of greater than 0 to not greater than 1; b represents a number of 0.1 to 3; and z represents a number of 1 to 8.

10. The nonaqueous secondary battery as in claim 9, wherein said negative electrode material is an amorphous composite oxide represented by formula (2):

$$SnM^3{}_cM^4{}_dO_y \qquad (2)$$

wherein $M^3$ represents at least two kinds of Al, B, and P; $M^4$ represents at least one kind of elements of groups 1, 2 and 3 of the Periodic Table and halogen elements; c represents a number of 0.2 to 2; d represents a number of 0.01 to 1, provided that 0.21<c+d<2; and y represents a number of 1 to 6.

11. The nonaqueous secondary battery as in claim 10, wherein said negative electrode material is an amorphous composite oxide represented by formula (3):

$$SnM^3{}_cM^5{}_dO_y \qquad (3)$$

wherein $M^3$ represents at least two kinds of Al, B, and P; $M^5$ represents at least one kind of K, Na, Rb, Cs, Ca, Mg, Ba, and Y; c represents a number of 0.2 to 2; d represents a number of 0.01 to 1, provided that 0.21<c+d<2; and y represents a number of 1 to 6.

12. The nonaqueous secondary battery as in claim 11, wherein said negative electrode material is an amorphous composite oxide represented by formula (4):

$$SnM^3{}_cM^6{}_dO_y \qquad (4)$$

wherein $M^3$ represents at least two kinds of Al, B, and P; $M^6$ represents at least one kind of K, Na, Rb, and Cs; c represents a number of 0.2 to 2; d represents a number of 0.01 to 1, provided that 0.21<c+d<2; and y represents a number of 1 to 6.

13. The nonaqueous secondary battery as in claim 10, wherein said negative electrode material is an amorphous composite oxide represented by formula (5):

$$SnM^3{}_cM^5{}_dM^7{}_eO_y \qquad (5)$$

wherein $M^3$ represents at least two kinds of Al, B, and P; $M^5$ represents at least one kind of K, Na, Rb, Cs, Ca, Mg, Ba, and Y; $M^7$ represents F; c represents a umber of 0.2 to 2; d and e represent a number of 0.01 to 1, provided that 0.22<c+d<2; and y represents a number of 1 to 6.

14. The nonaqueous secondary battery as in claim 10, wherein said negative electrode material is an amorphous composite oxide represented by formula (7):

$$SnGe_fM^8{}_gM^9{}_hO_x \qquad (7)$$

wherein $M^8$ represents at least one kind of Al, B, and P; $M^9$ represents at least one kind of K, Na, Rb, Cs, Ca, Mg, and Ba; f represents a number of 0.001 to 1; g represents a number of 0.2 to 2; h represents a number of 0.01 to 1; and x represents a number of 1.3 to 7.

15. The nonaqueous secondary battery as in claim 14, wherein said negative electrode material is an amorphous composite oxide represented by formula (8):

$$SnGe_fM^8{}_gM^{10}{}_hO_x \qquad (8)$$

wherein $M^8$ represents at least one kind of Al, B, and P; $M^{10}$ represents at least one kind of K, Rb, Cs, and Mg; f represents a number of 0.001 to 1; g represents a number of 0.2 to 2; h represents a number of 0.01 to 1; and x represents a number of 1.3 to 7.

16. The nonaqueous secondary battery as in claim 1, wherein said negative electrode material is an amorphous composite oxide represented by formula (9):

$$SnGe_iM^8{}_jM^{10}{}_kO_w \qquad (9)$$

wherein $M^8$ represents at leas tone kind of Al, B, and P; $M^{10}$ represents at least one kind of K, Rb, Cs, and Mg; i represents a number of 0.01 to 0.5; j represents a number of 0.4 to 1.3; k represents a number of 0.05 to 0.5; and w represents a number of 1.3 to 6.

17. The nonaqueous secondary battery as in claim 1, wherein said negative electrode material is obtained by calcination comprising heating at a rate of 5 to 200° C./min, maintaining at 500 to 1500° C. for 0.1 to 100 hours, and cooling at a rate of 2 to $10^{7°}$ C./min.

18. The nonaqueous secondary battery as in claim 1, wherein said negative electrode material contains 0 to 10 wt % of particles having a particle size of 25 to 100 μm.

19. The nonaqueous secondary battery as in claim 1, wherein said negative electrode material contains 0.01 to 5 wt % of particles having a particle size of 0.01 to 1 μm.

20. The nonaqueous secondary battery as in claim 1, wherein at least part of said positive electrode material is $Li_lQO_v$, wherein at least part of Q is a transition metal at least one of which is selected from Co, Mn, Ni, V, and Fe; l=0.2 to 1.2; v=1.4 to 3.

21. The nonaqueous secondary battery as in claim 1, wherein the solvent of said nonaqueous electrolyte contains ethylene carbonate.

22. The nonaqueous secondary battery as in claim 1, wherein said negative electrode and/or positive electrode has at least one protective layer.

23. The nonaqueous secondary battery as in claim 1, wherein said separator is a porous film or fabric each containing at least 20% by weight of an ethylene component.

* * * * *